United States Patent [19]

Miyamoto et al.

[11] Patent Number: 5,579,066
[45] Date of Patent: Nov. 26, 1996

[54] CAMERA

[75] Inventors: Hidenori Miyamoto, Urayasu; Toshiyuki Nakamura; Isao Soshi, both of Tokyo, all of Japan

[73] Assignee: Nixon Corporation, Tokyo, Japan

[21] Appl. No.: 205,848

[22] Filed: Mar. 4, 1994

[30] Foreign Application Priority Data

Mar. 9, 1993 [JP] Japan ............................. 5-048323
Mar. 29, 1993 [JP] Japan ............................. 5-070262

[51] Int. Cl.⁶ ........................... G03B 17/24; G03B 17/18
[52] U.S. Cl. ........................... 396/279; 396/277; 396/310
[58] Field of Search ................................ 354/468, 484, 354/105, 106, 289.1, 289.12

[56] References Cited

U.S. PATENT DOCUMENTS

| 4,855,781 | 8/1989 | Hoshino | 354/468 |
| 4,958,174 | 9/1990 | Goto et al. | 354/106 |
| 4,965,626 | 10/1990 | Robison et al. | 354/106 |
| 5,081,483 | 1/1992 | Ishimura et al. | 354/468 |
| 5,119,119 | 6/1992 | Amano et al. | 354/106 |
| 5,390,130 | 2/1995 | Watanabe et al. | 354/468 |

FOREIGN PATENT DOCUMENTS 3-223835 10/1991 Japan.

*Primary Examiner*—A. A. Mathews
*Attorney, Agent, or Firm*—Oliff & Berridge

[57] ABSTRACT

In a camera which is provided with a clock which operates according to electrical power supplied from a battery, the date and time of photography are imprinted based upon the date and time output from the clock. When the changeover of the battery is detected, the recording of the date and time of photography is prevented, and when the date and time of the clock have been reset the prevention of recording of the date and time of photography is ceased.

Further, in a camera which is provided with a clock which operates according to electrical power supplied from a battery, and with a display device which alternatively displays either the date and time output from the clock or the film frame number, when the changeover of the battery is detected, forcibly the date and time output from the clock are displayed on the display device.

9 Claims, 29 Drawing Sheets

VISTA MODE

SINGLE SELF TIMER MODE

DOUBLE SELF TIMER MODE

NORMAL PHOTOGRAPHY MODE            (NO DISPLAY)

CAMERA

BACKGROUND OF THE INVENTION

1. Field of the Invention

The present invention relates to a camera equipped with a clock and with a device for recording date and time of photography.

2. Related Background Art

A per se known type of camera is equipped with a clock which is driven by electrical power supplied from a battery and which outputs clock data specifying the current date and time, and the camera, based upon this clock data, imprints the date and time of photography upon the photographic film.

However, with such a prior art type of camera, when the operator changes the battery for a new one, the operation of the clock is temporarily stopped because its operating electrical power from the battery is temporarily interrupted, so that the current date and time on the clock are lost. When the changing of the battery has been completed the supply of operating electrical power from the battery to the clock is again restored, and the date and time on the clock automatically are reset to previously determined initial values, and time measurement recommences from these initial values. For this reason, upon changing the battery, it is necessary for the operator to reset the clock to the correct date and time again, but there is the problem that if this resetting process is forgotten a mistaken date and time of photography will be imprinted on the film.

SUMMARY OF THE INVENTION

The objective of the present invention is to provide a camera which, even after such a clock battery has been changed, without any requirement for the operator manually to reset the clock, is capable of imprinting the correct date and time of photography upon the photographic film.

In order to attain this objective, the present invention is applied to a camera comprising: a clock which operates according to electrical power supplied from a battery and outputs the date and the time; a reset switch to reset the date and the time of said clock; and a data imprint device to imprint the date and the time of photography based upon the date and the time output from said clock. And the camera according to the present invention comprises: a changeover detector to detect the changeover of said battery; and a control device to prevent the imprinting by said data imprint device of the date and the time of photography when the changing over of said battery is detected by said changeover detector, and to cease the prevention of said imprinting when the date and the time of said clock have been reset by said reset switch.

When the changing over of the battery is detected, the recording of the date and the time of photography is prevented, so that even if the operator forgets to reset the date and the time it is impossible for a mistaken date and time of photography to be imprinted on the film. When the date and the time of said clock have been reset, this prevention of the recording of the date and the time of photography is released.

Further, in order to attain the above described objective, the present invention may be applied to a camera comprising: a clock which operates according to electrical power supplied from a battery and outputs the date and the time; and a display device which alternatively displays either date/time data output from said clock or the film frame number. In this case, the camera according to the present invention comprises: a changeover detector to detect the changeover of said battery; and a control device to forcibly display on said display device the date and the time output from said clock, when the changeover of said battery is detected by said changeover detector.

When the changing over of the battery is detected, the date and the time which are output from said clock are forcibly displayed on said display device, so that when the battery is changed over the operator is encouraged to reset the date and the time, and an erroneous date and time of photography are prevented from being recorded.

DESCRIPTION OF THE PREFERRED EMBODIMENTS

Preferred Embodiment 1

Figure 1:
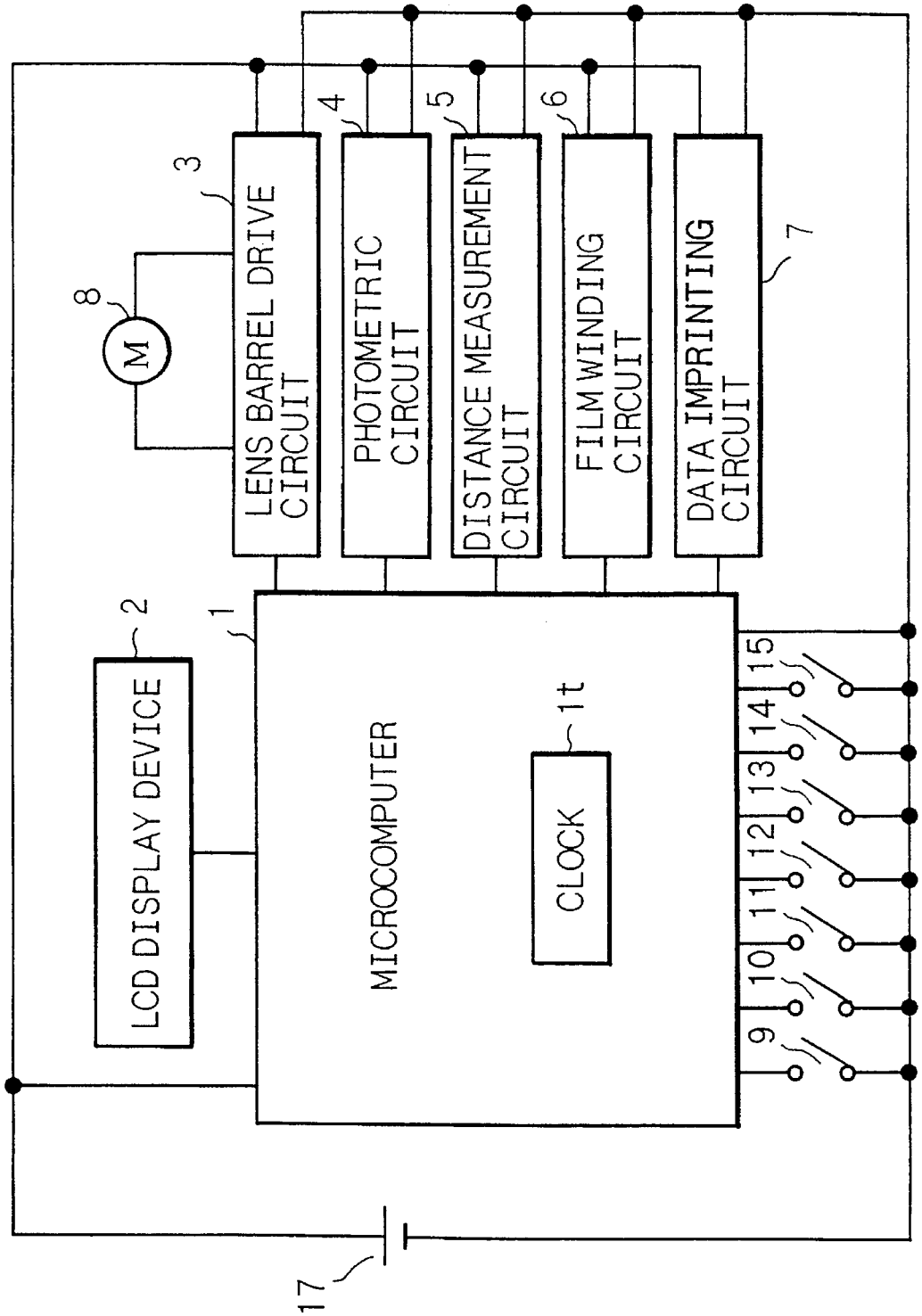
FIG. 1 is a functional block diagram showing the construction of a camera which is the first preferred embodiment of the present invention.

FIG. 1 is a functional block diagram showing the construction of a camera which is the first preferred embodiment of the present invention.

A microcomputer 1 comprises a clock it which outputs clock data consisting of the current date and the current time, and performs various calculations for sequence control of the camera by executing various control programs which will be described hereinafter. A liquid crystal (LCD) display device 2, a lens barrel drive circuit 3, a photometric circuit 4, a distance measurement circuit 5, a film winding circuit 6, a data imprinting circuit 7, and switches 9 through 15 are connected to the microcomputer 1.

The LCD display device 2 is provided on the upper surface of the camera body, and displays information related to photography such as various photographic modes and imprint data and the like, according to a display command signal which it receives from the microcomputer 1,. The lens barrel drive circuit 3 actuates a motor 8 to move the barrel of the photographic lens from its retracted position to the proper position for photography, according to a lens drive signal which it receives from the microcomputer 1. The photometric circuit 4 measures the brightness of the object to be photographed according to a command signal which it receives from the microcomputer 1, and outputs a value representative of the measured brightness to the microcomputer 1. And the distance measurement circuit 5 measures the photographic distance to the object to be photographed according to a command signal which it receives from the microcomputer 1, and outputs a value representative of the measured distance to the microcomputer 1.

The film winding circuit 6 performs winding on or rewinding of the film loaded in the camera, according to a film winding command signal which it receives from the microcomputer 1. The data imprinting circuit 7 imprints various information such as the date and/or the time of photography upon each frame of the film as it is shot, according to a film imprinting signal which it receives from the microcomputer 1. Further, in this first preferred embodiment of the present invention, it is supposed that the data imprinting mode can be set either to a selection mode or a correction mode, and that in this selection mode any one of the data imprinting formats "YMD" (year-month-day), "MDY" (month-day-year), "DMY" (day-month-year), "DHM" (day-hour-minute), or "OFF" (no imprinting) can be selected, while in the correction mode the setting on the clock it for the current date and the current time can be corrected. A battery 17 supplies operating electrical power to all of the circuits and equipment of this camera, including the microcomputer 1, the clock it, the lens barrel drive circuit 3, the photometric circuit 4, the distance measurement circuit 5, the film winding circuit 6, and the data imprinting circuit 7 and the like.

The switch 9 is a main switch for starting all of the various operations of the camera, while the switch 10 is a mode selection switch for selecting the various flash photography modes. In this first preferred embodiment of the present invention, it is supposed that there are five types of flash photography mode available: automatic flash mode, red eye reduction mode, flash inhibit mode, forced flash mode, and slow synchro mode. Further, this flash mode selection switch 10 is also used in the clock data correction mode as a switch for changing over the data block which is to be the subject of correction, as will be explained hereinafter. The switch 11 is a mode select switch for selecting the photographic mode. In this first preferred embodiment, it is supposed that the following photographic modes are available: normal photography mode, vista photography mode, single self timer photography mode, and double self timer photography mode. Further, this photographic mode select switch 11 is also used in the clock data correction mode as a switch for correcting the data on the clock it, as will be explained hereinafter. The switch 12 is a first stroke switch which is turned on when a shutter release button, not shown, of the camera is pressed by the camera operator as far as a first stroke position thereof, while the switch 13 is a second stroke switch which is turned on when said shutter release button is pressed by the camera operator as far as a second stroke position thereof. And the switch 14 is a lens barrel position detection switch which is turned off when the barrel of the photographic lens is in its retracted position and is turned on when said lens barrel is moved to any position for photography, while the switch 15 is a battery compartment lid switch which is turned on when a lid (not particularly shown) of a compartment (not shown either) in the camera body in which the battery 17 is received is in its open position, and is turned off when said battery compartment lid is in its closed position.

Figure 2:
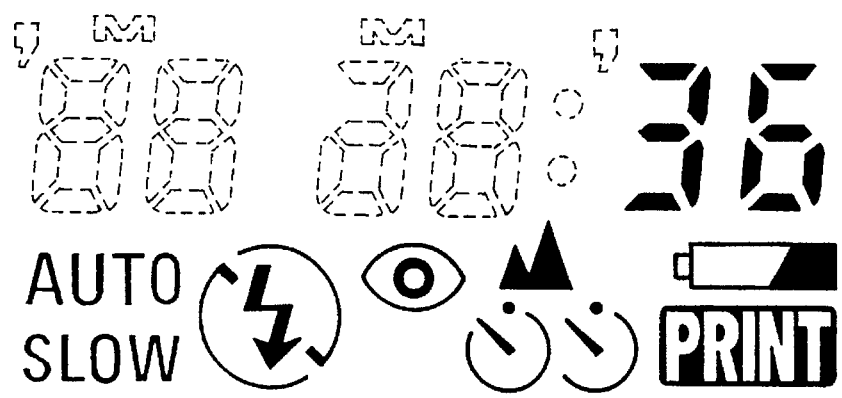
FIG. 2 is a figure showing an exemplary display on a liquid crystal display device included in this first preferred embodiment.
Figure 3:
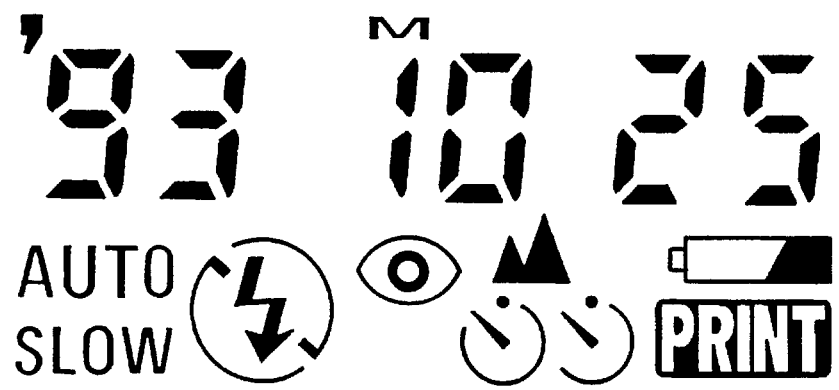
FIG. 3 is a figure showing another exemplary display on said liquid crystal display device included in this first preferred embodiment.
Figure 4:
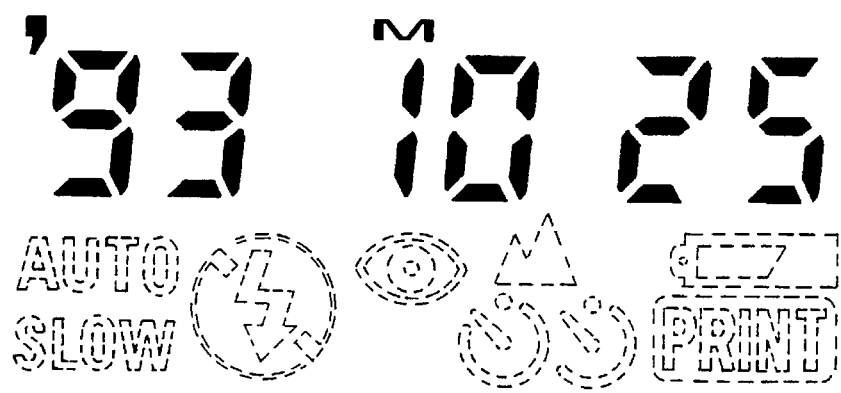
FIG. 4 is a figure showing yet another exemplary display on said liquid crystal display device included in this first preferred embodiment.

FIGS. 2 through 4 are figures showing exemplary displays on the LCD display device 2. FIG. 2 is an example in which film frame number is being displayed on the upper portion of the LCD display device 2, while symbols representative of flash photography mode, self timer mode, date imprint mode (PRINT), remaining battery charge, and the like are being displayed upon its lower portion. FIG. 3 is an example in which the date (in year-month-day format) is being shown on the upper portion of the LCD display device 2, while symbols representative of flash photography mode, self timer mode, date imprint mode (PRINT), remaining battery charge, and the like are being shown upon its lower portion. Thus, the symbol PRINT is displayed when the data imprint mode is set, while the symbol PRINT is turned out when data imprinting is inhibited (the data imprint mode is not set). And FIG. 4 is an example in which only the date (in year-month-day format) is being shown on the upper portion of the LCD display device 2.

Figure 5A:
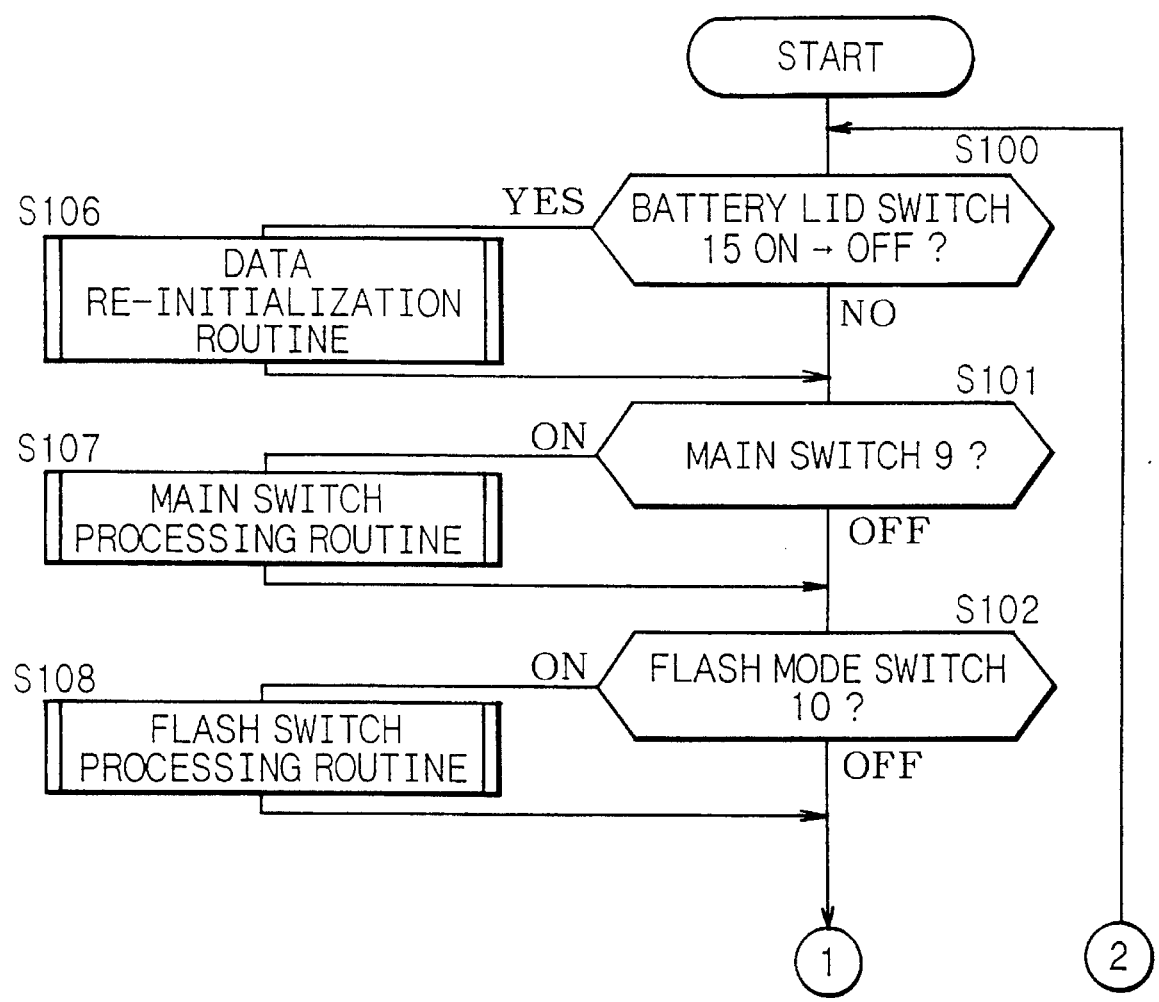
FIGS. 5A and 5B are flow charts showing a main program for a microcomputer included in this first preferred embodiment.
Figure 5B:
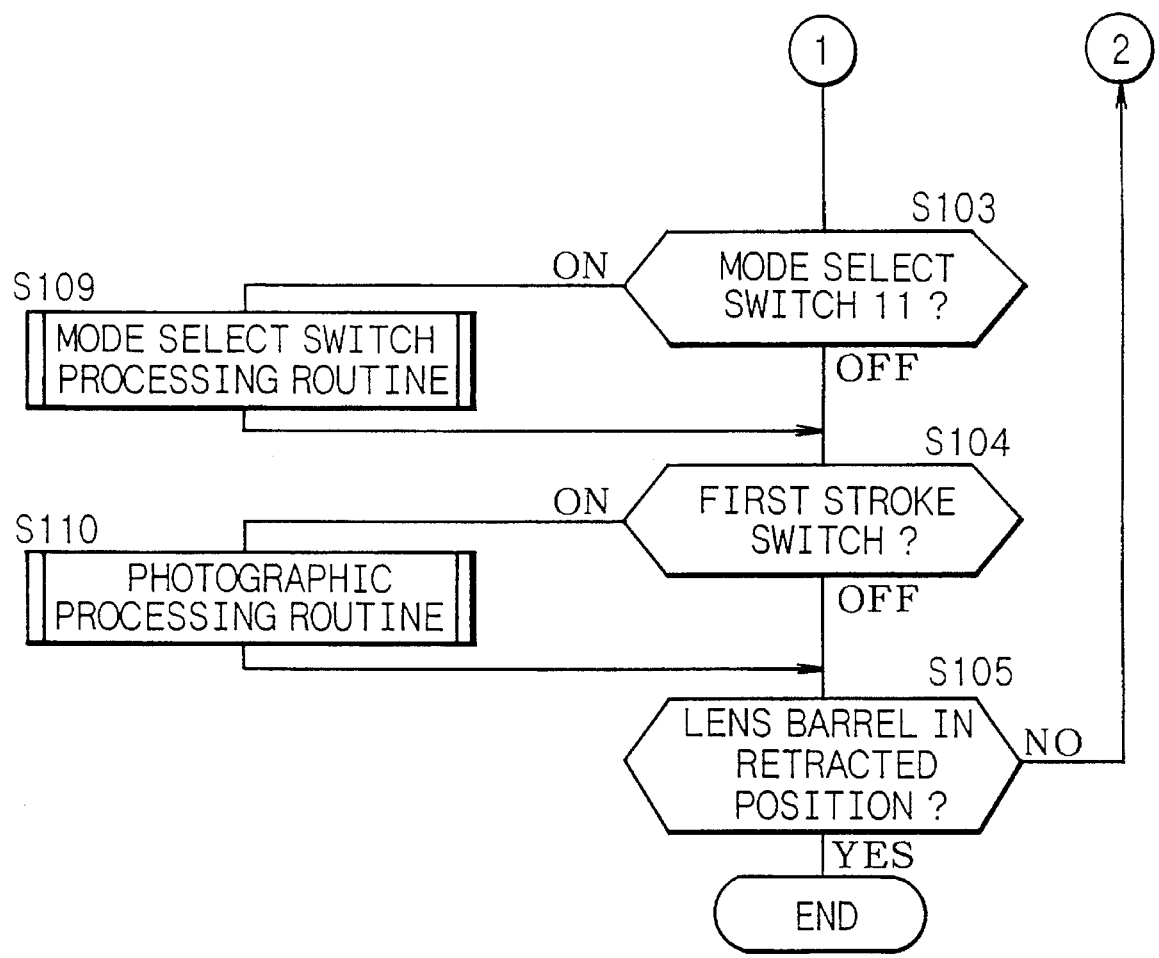

FIGS. 5A and 5B are flow charts showing the main program for the microcomputer 1. The operation of this first preferred embodiment of the present invention will now be explained with reference to these flow charts.

Figure 6:
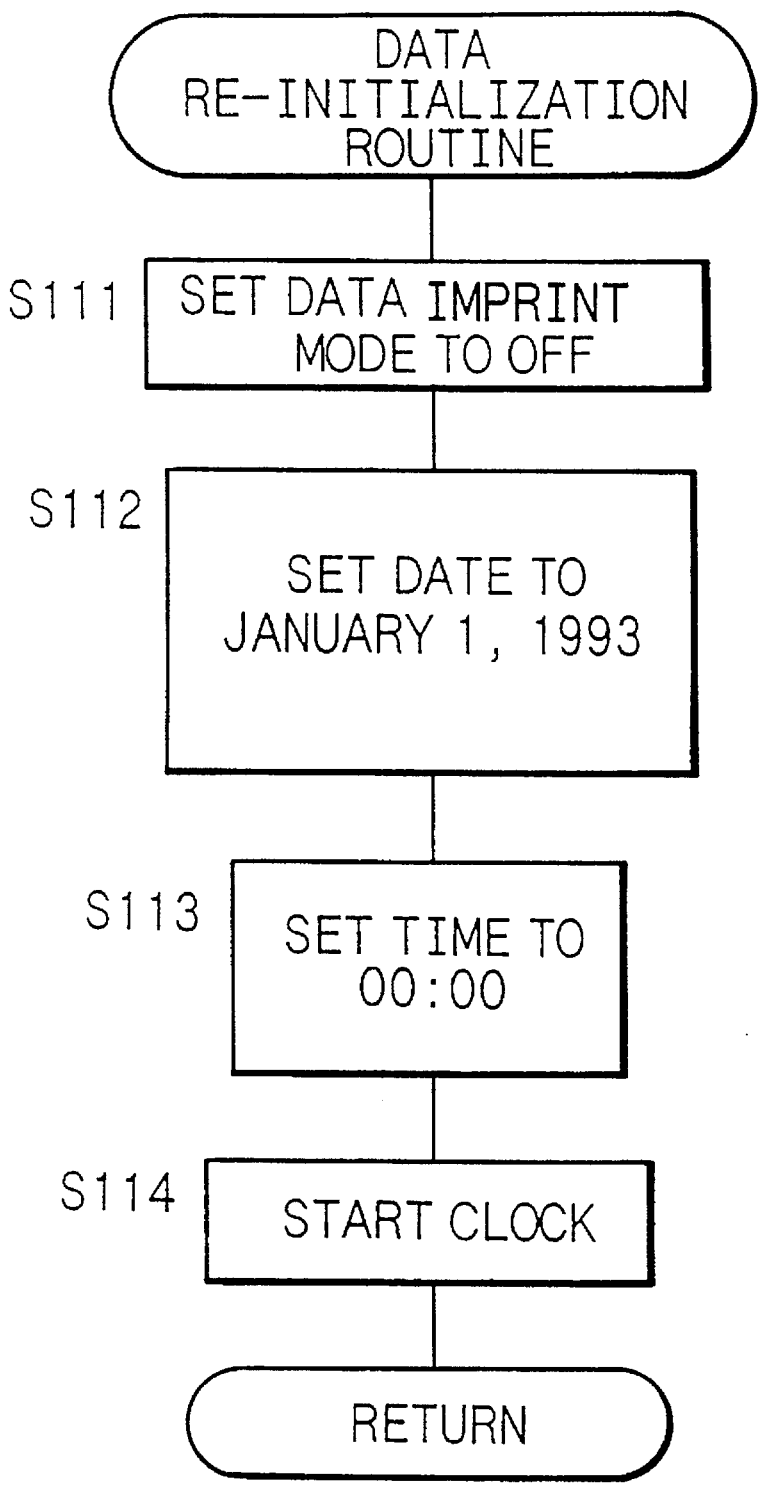
FIG. 6 is a flow chart showing a data re-initialization routine for this microcomputer of this first preferred embodiment.
Figure 7:
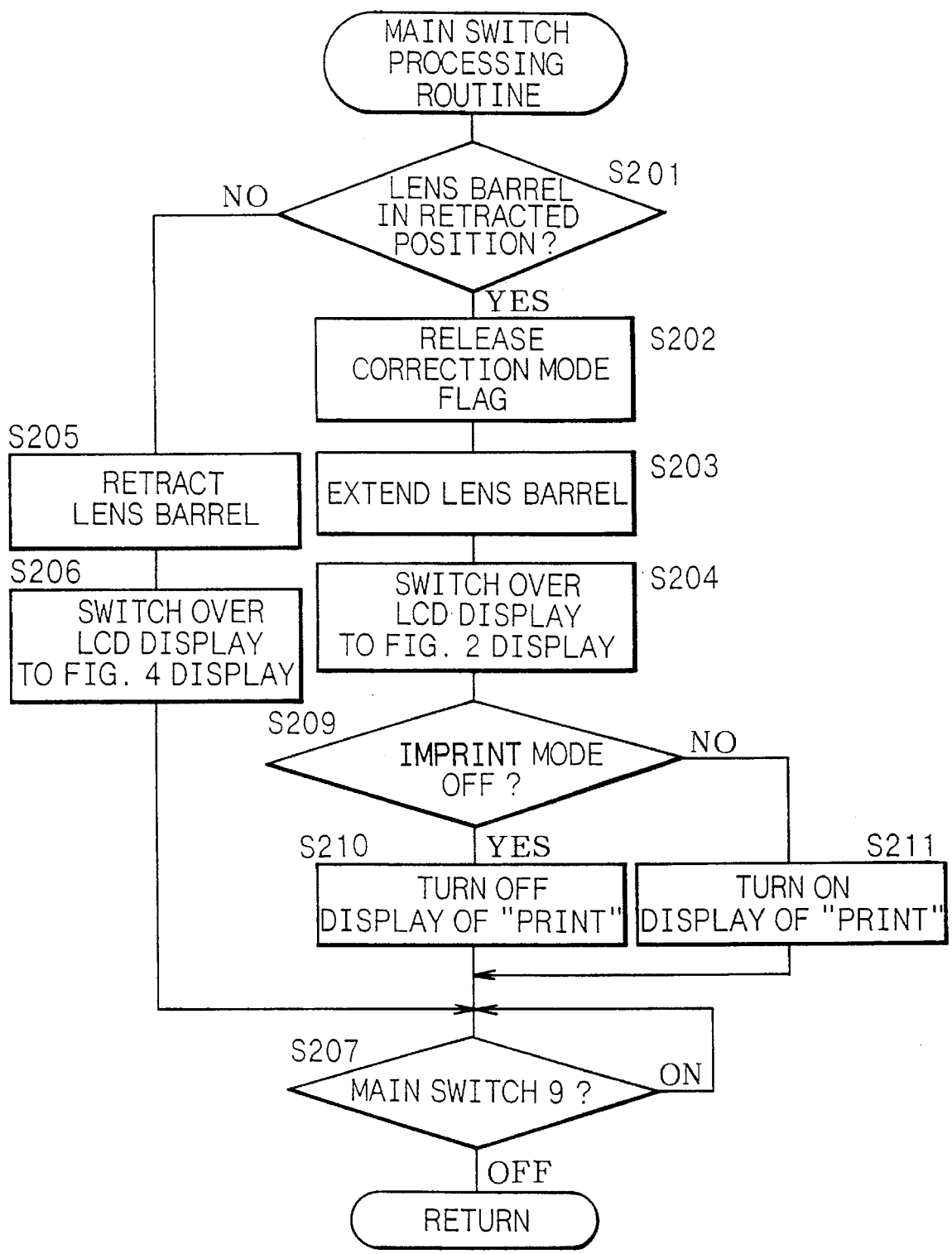
FIG. 7 is a flow chart showing a main switch processing routine for this first preferred embodiment microcomputer.
Figure 8A:
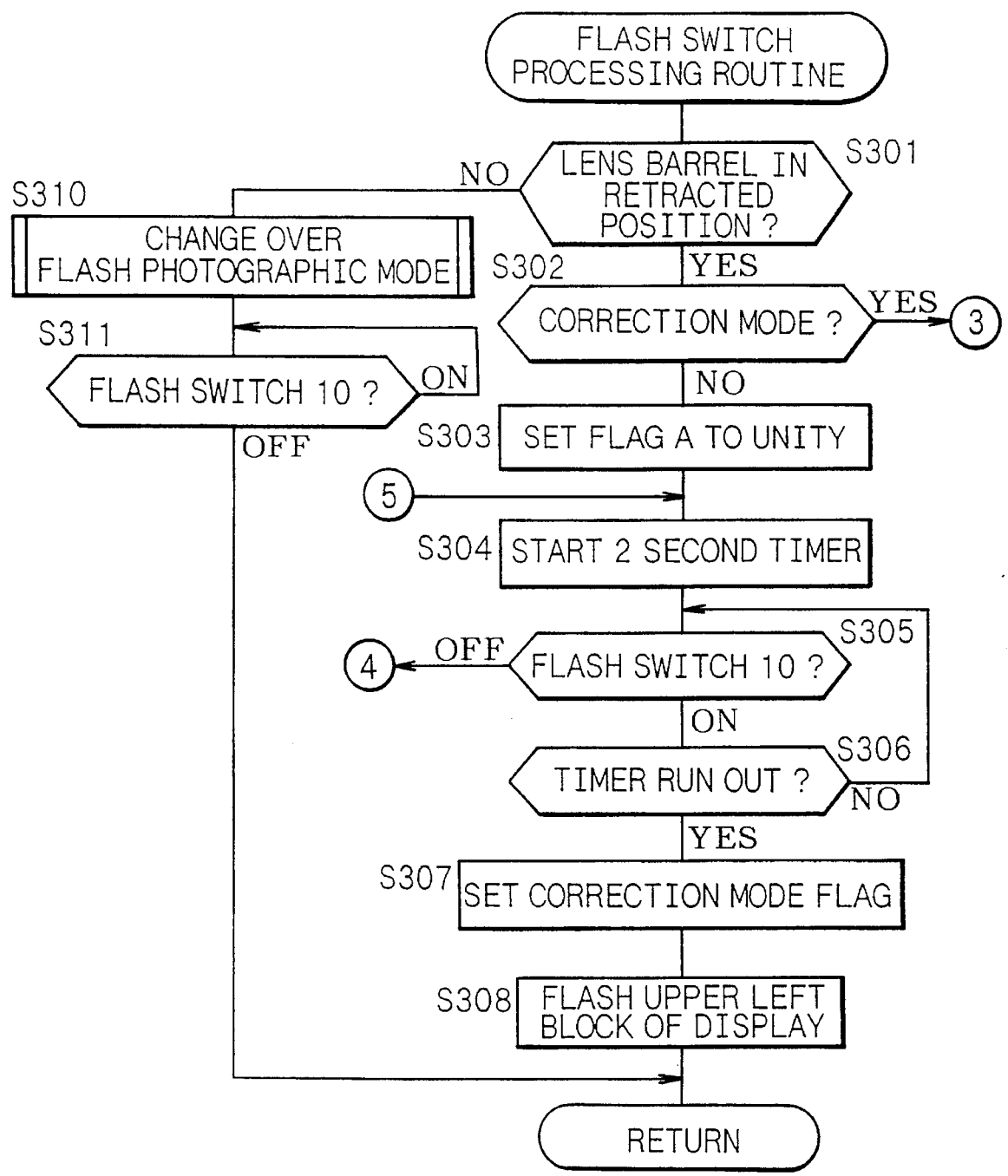
FIGS. 8A, 8B, and 8C are flow charts showing a flash switch processing routine for this first preferred embodiment microcomputer.
Figure 8B:
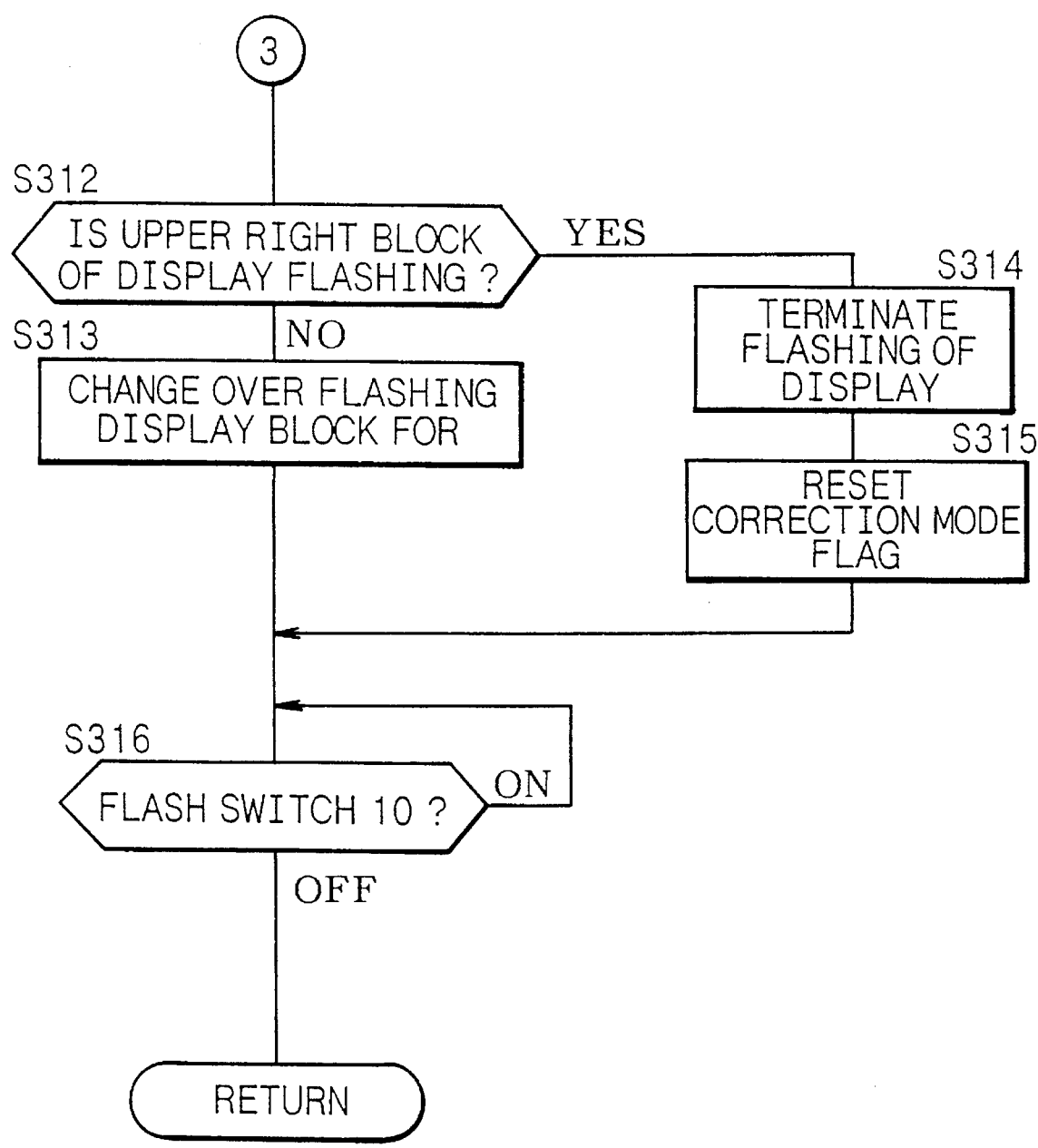
Figure 8C:
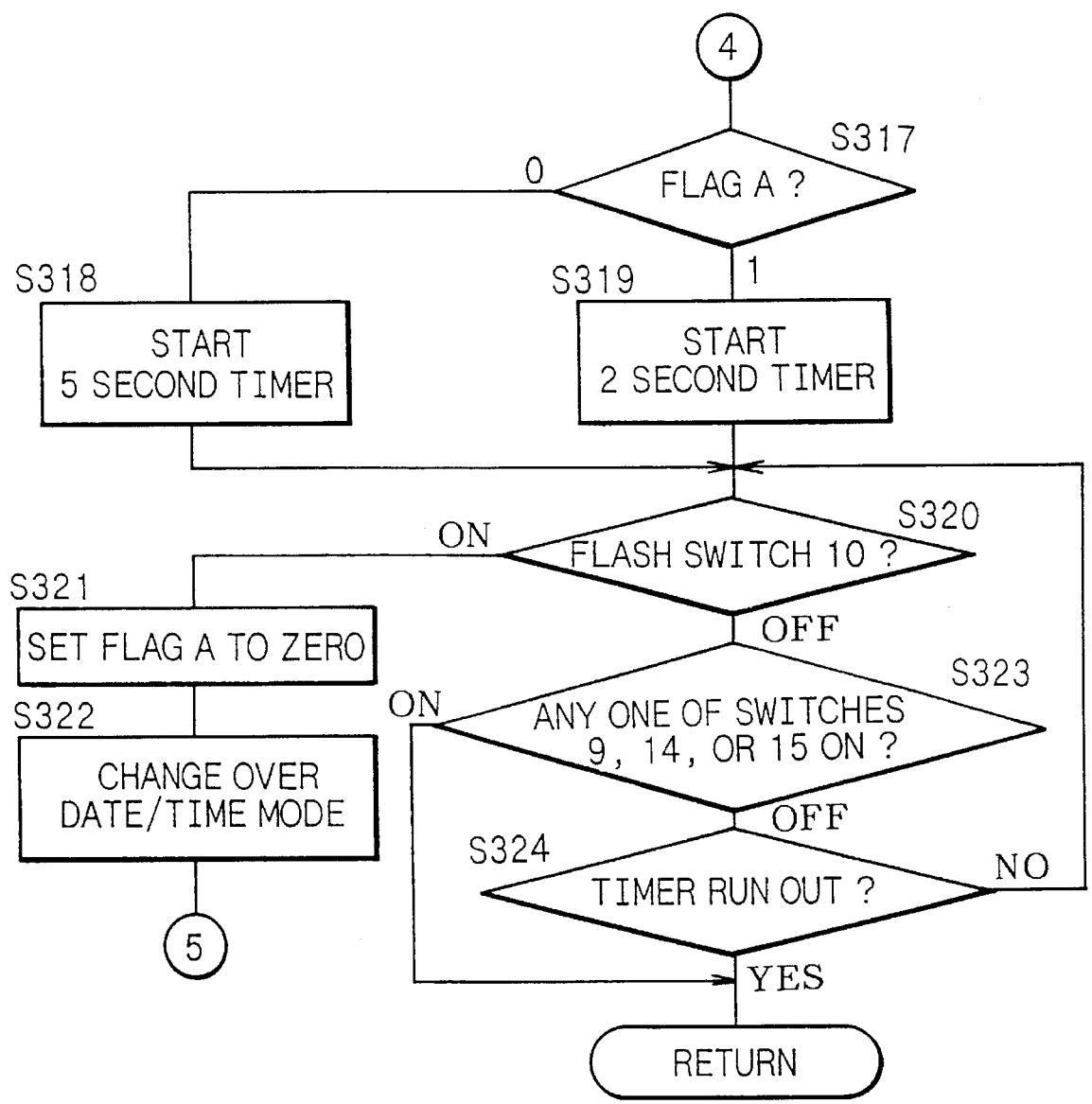

After the START of this program, in the decision step S100 the microcomputer 1 makes a decision as to whether or not the battery compartment lid switch 15 has transited from the ON state to the OFF state, and if the result of this decision is YES then this indicates that the battery compartment lid has been closed from the open condition and means that the changing of the battery has been performed, and the flow of control proceeds to the step S106, while if the result is NO this indicates that the changing of the battery has not been performed, and the flow of control proceeds to the decision step S101. When it is decided that the changing of the battery has been performed, in the step S106 the data re-initialization routine whose flow chart is shown in FIG. 6 and which will be described hereinafter is executed. Next, in the decision step S101, a decision is made as to whether or not the main switch 9 is ON, and if it is then the flow of control is transferred to the step S107, while if said main switch 9 is OFF then the flow of control passes next to the decision step S102. When it is decided that the main switch 9 is ON, in the step S107 the main switch processing routine whose flow chart is shown in FIG. 7 and which will be described hereinafter is executed. Next, in the decision step S102, a decision is made as to whether or not the flash mode selection switch 10 is ON, and if it is then the flow of control is transferred to the step S108, while if said flash mode selection switch 10 is OFF then the flow of control passes next to the decision step S103. When it is decided that the flash mode selection switch 10 is ON, in the step S108 the flash switch processing routine whose flow chart is shown in FIGS. 8A, 8B, and 8C and which will be described hereinafter is executed.

Figure 9:
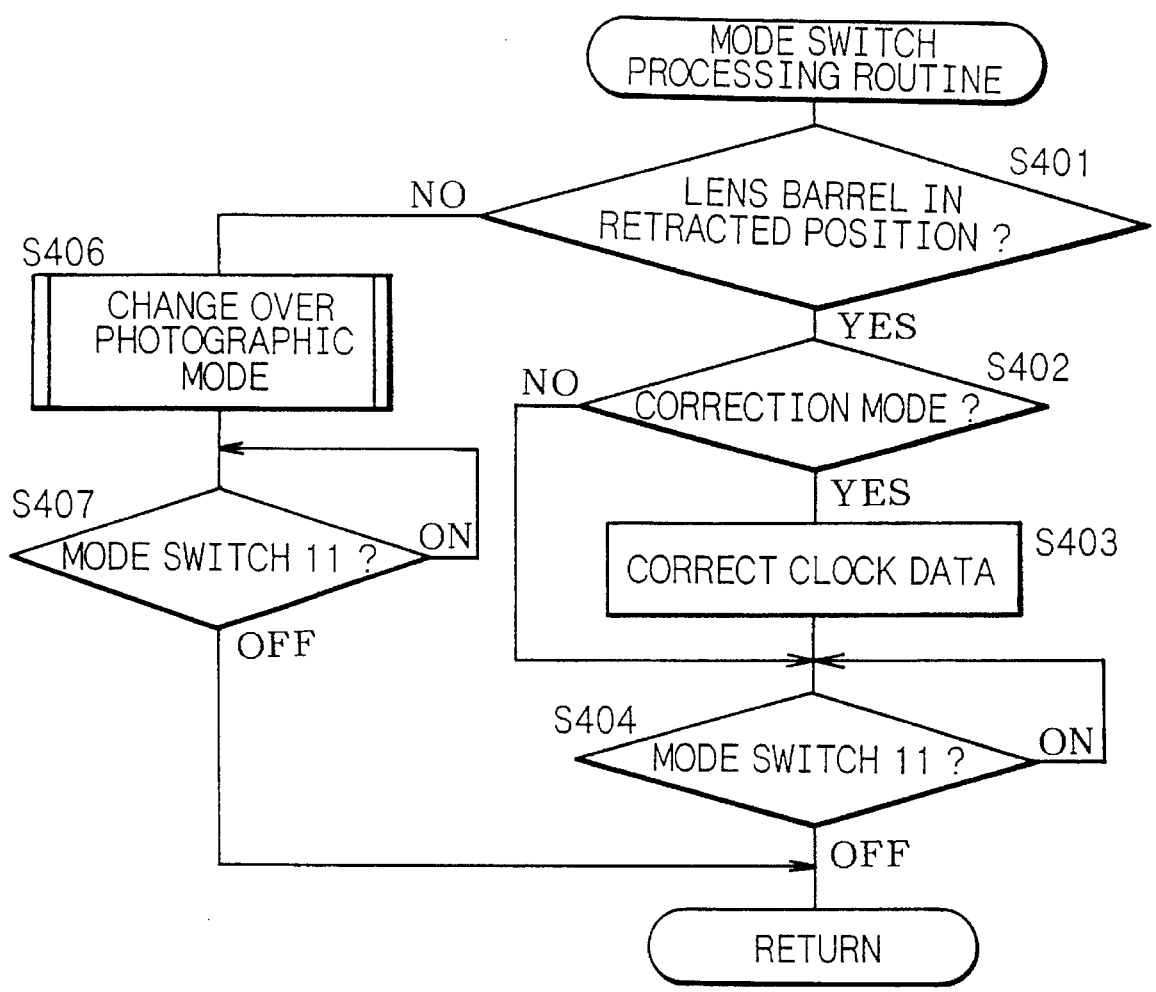
FIG. 9 is a flow chart showing a mode switch processing routine for this first preferred embodiment microcomputer.
Figure 10A:
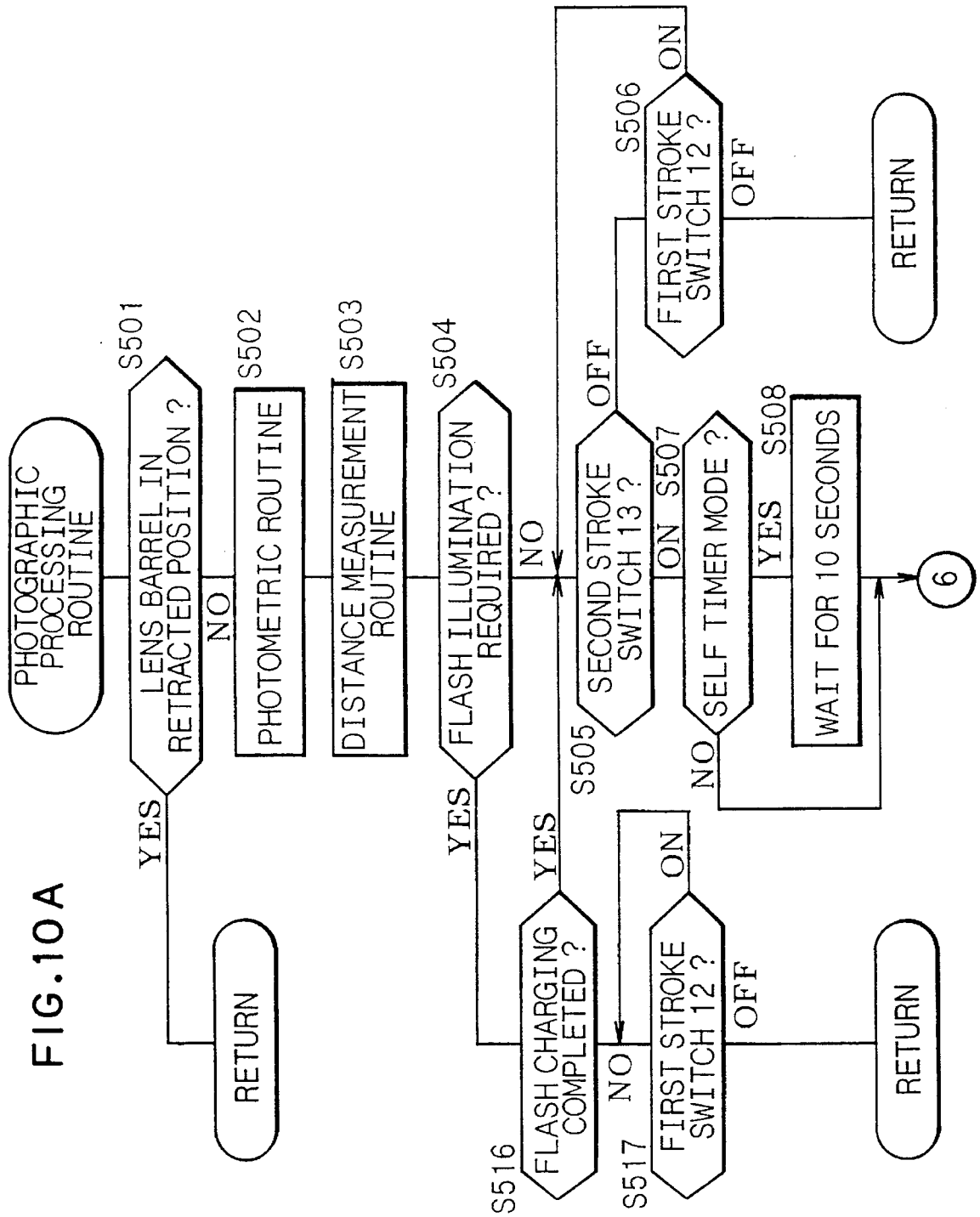
FIGS. 10A and 10B are flow charts showing a photographic processing routine for this first preferred embodiment microcomputer.
Figure 10B:
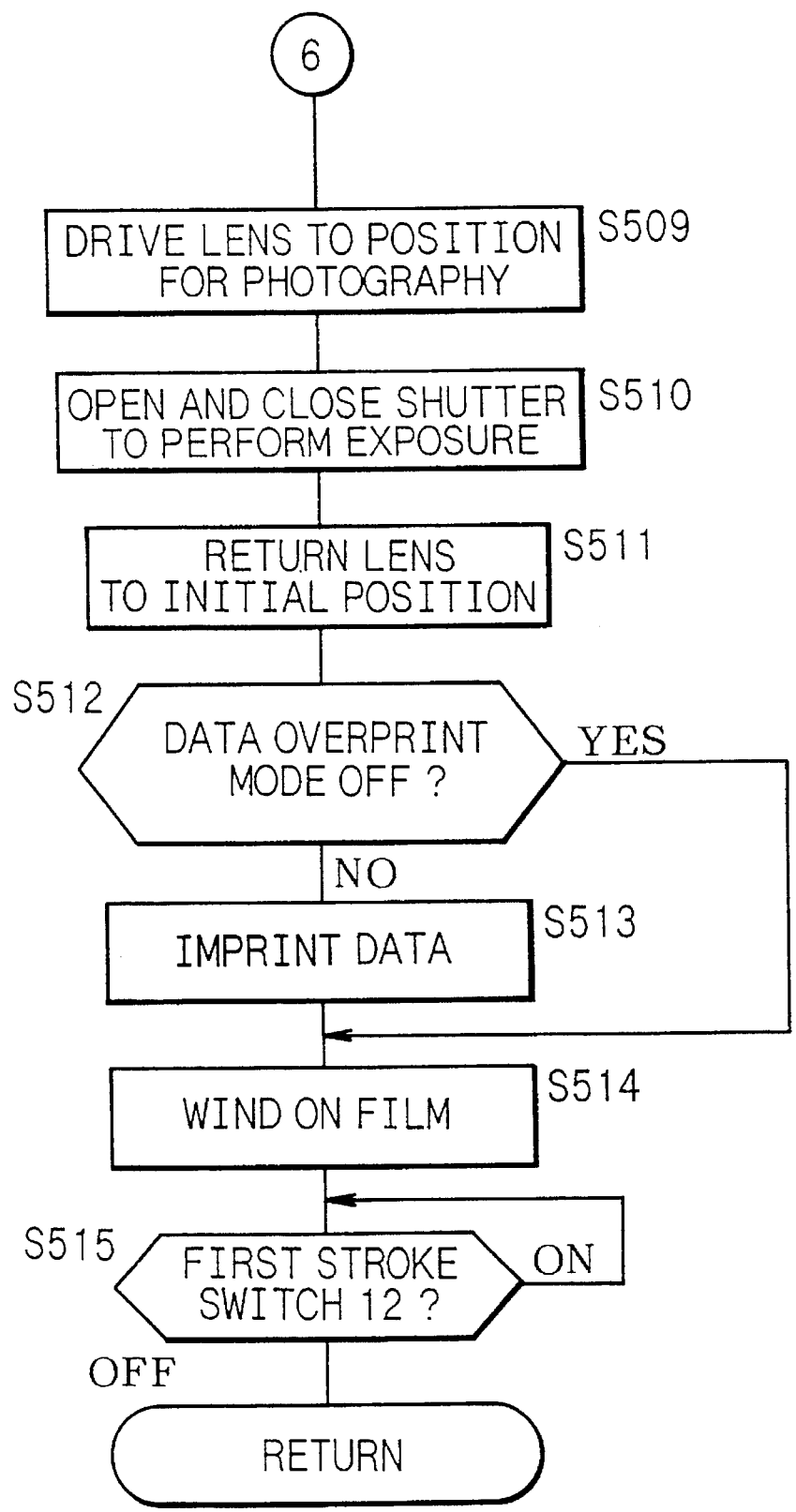

Next, in the decision step S103, a decision is made as to whether or not the photographic mode select switch 11 is ON, and if it is then the flow of control is transferred to the step S109, while if said photographic mode select switch 11 is OFF then the flow of control passes next to the decision step S104. When it is decided that the photographic mode select switch 11 is ON, then in the step S109 the mode select switch processing routine whose flow chart is shown in FIG. 9 and which will be described hereinafter is executed. Next, in the decision step S104, a decision is made as to whether or not the first stroke switch 12 is ON, i.e. as to whether or not the shutter release button of the camera is being depressed by the photographer as far as its first stroke position, and if it is then the flow of control is transferred to the step S110, while if said first stroke switch 12 is OFF then the flow of control passes next to the decision step S105. When it is decided that the shutter release button is being depressed as far as its first stroke position, then in the step S110 the photographic processing routine whose flow chart is shown in FIGS. 10A and 10B and which will be described hereinafter is executed. In the step S105 a decision is made as to whether or not the lens barrel of the camera is in its retracted position, based upon the output from the lens barrel position detection switch 14, and if the camera lens barrel is currently retracted then execution of this main routine terminates, while if not then the flow of control returns to the decision step S100 and the above described processing is repeated.

The details of the operation of the five routines mentioned above will now be explained with reference to the flow charts shown in FIGS. 6 through 10.

FIG. 6 is a flow chart showing the details of the data re-initialization routine which was summarized as the step S106 of FIG. 5A.

Figure 14:
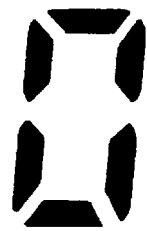
FIG. 14 is a figure showing an exemplary display on the liquid crystal display device included in this first preferred embodiment, when data imprinting is prevented.
Figure 14:
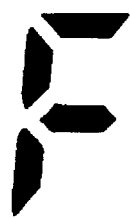
Figure 14:

The microcomputer 1 executes this routine when the battery compartment lid has been closed from the open condition. First, in the step S111, the data imprint mode is set to OFF, so that data imprinting is prevented. When the data imprint mode is set to OFF, the LCD display device 2 is compelled only to display the word "OFF", as shown in FIG. 14. In the next step S112, the date is set to a predetermined date. In this first preferred embodiment of the present invention, the date is set to Jan. 1, 1993 ('93.1.1 in Y-M-D format). In the next step S113, the time is set to a predetermined time. In this first preferred embodiment of the present invention, the time is set to 00:00. And, in the last step S114, the clock is started at this set date and time; and then the flow of control returns to the FIG. 5A flow chart of the main routine.

FIG. 7 is a flow chart showing the details of the main switch processing routine which was summarized as the step S107 of FIG. 5A.

The microcomputer 1 executes this routine when the main switch 9 is turned on. First, in the step S201, a decision is made as to whether or not the barrel of the photographic lens of the camera is in its retracted position, based upon the output from the lens barrel position detection switch 14, and if the lens barrel is retracted the flow of control passes to the step S202, while if it is not then the flow of control is transferred to the step S205. When the barrel of the photographic lens is in its retracted position, in the step S202 the flag indicating the correction mode for the clock data is released, and the flow of control passes to the step S203, in which the microcomputer 1 controls the lens barrel drive circuit 3 so as to extend the lens barrel towards its proper position for photography. The flow of control passes next to the step S204, in which the display on the LCD display device 2 is switched from the data display shown in FIG. 4 to the photographic mode display shown in FIG. 2. By doing this, the upper portion of the LCD display device 2 is caused to display the film frame number. In the next decision step S209, a decision is made as to whether or not the data imprint mode is set to OFF, and if it is then the flow of control passes to the step S210 in which the display of the symbol "PRINT" is turned off, while if the data imprint mode is not set to OFF then the flow of control passes to the step S211 in which the display of the symbol "PRINT" is turned on. After either of these steps, the flow of control proceeds to the decision step S207, which loops around in a tight loop while the main switch 9 of the camera is ON; and when said main switch 9 is turned OFF the flow of control returns to the FIG. 5A flow chart of the main routine.

On the other hand, if the result of the decision in the step S201 is that the barrel of the photographic lens of the camera is not in its retracted position, the flow of control passes to the step S205, in which the microcomputer 1 controls the lens barrel drive circuit 3 so as to retract the lens barrel back to its retracted position, and then the flow of control passes to the step S206, in which the display on the LCD display device 2 is switched from the photographic mode display shown in FIG. 2 to the data display shown in FIG. 4. By doing this, the upper portion of the LCD display device 2 is caused to display the date or the time or a combination thereof. Then the flow of control proceeds to the step S207, from which as before, when the main switch 9 is found to be OFF, the flow of control returns to the FIG. 5A flow chart of the main routine.

FIGS. 8A through 8C are flow charts showing the details of the flash switch processing routine which was summarized as the step S108 of FIG. 5A.

The microcomputer 1 executes this routine when the flash mode selection switch 10 is turned on. First, in the step S301, a decision is made as to whether or not the barrel of the photographic lens of the camera is in its retracted position, based upon the output from the lens barrel position detection switch 14, and if the lens barrel is retracted the flow of control passes to the step S302, while if it is not then the flow of control is transferred to the step S310.

Figure 11:
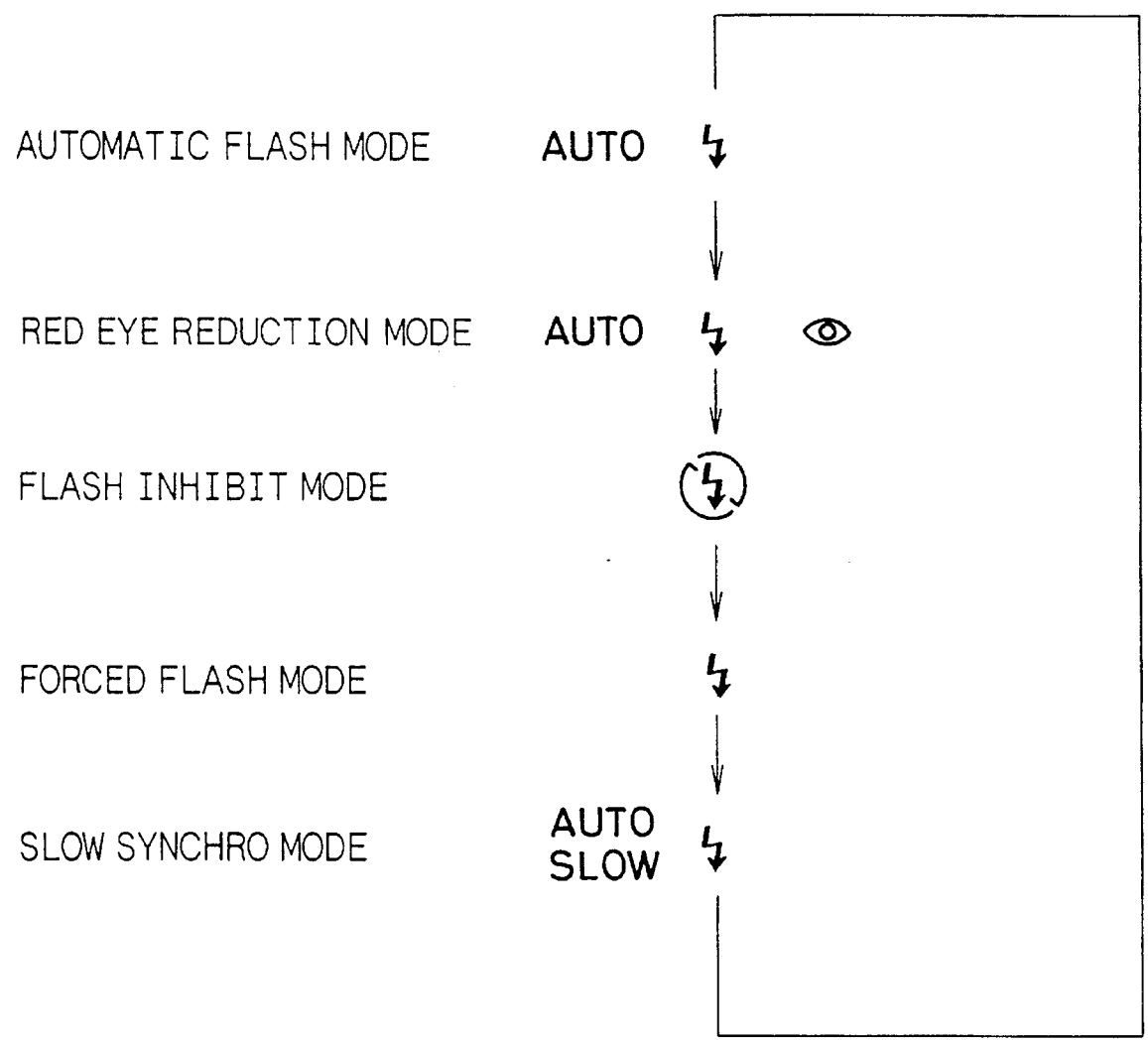
FIG. 11 is a figure showing the changeover cycle for flash photography mode.

When the barrel of the photographic lens is not in its retracted position, then in the step S310 the system changes over the flash photographic mode to the next value therefor in sequence, according to the cycle shown in FIG. 11. Thus: if the present flash photographic mode is the automatic flash mode, the system changes over to the red eye reduction mode; if the present mode is the red eye reduction mode, the system changes over to the flash inhibit mode; if the present mode is the flash inhibit mode, the system changes over to the forced flash mode; if the present mode is the forced flash mode, the system changes over to the slow synchro mode; and, if the present mode is the slow synchro mode, the system changes over to the automatic flash mode. At this time, those symbols on the LCD display device 2 which are appropriate to that flash photographic mode which has been terminated and to that one which has been commenced are turned off and on respectively, as schematically shown towards the right side of FIG. 11. The flow of control then passes to the decision step S311, which loops around in a tight loop while the flash mode selection switch 10 is ON; and when said flash mode selection switch 10 is turned OFF the flow of control returns to the FIG. 5A flow chart of the main routine.

On the other hand, if in the step S301 it is decided that the barrel of the photographic lens of the camera is in its retracted position, then the flow of control passes onward in order to change over to the next block of clock data to be corrected, and a decision is made in the decision step S302 as to whether or not the system has already gone into the correction mode. If the system is already in the correction mode, then the flow of control is transferred to the step S312 of the FIG. 8B flow chart, while if not the flow of control passes next to the step S303. If the system is not in the correction mode then it is in the so called selection mode, and in the step S303 a flag A is set to unity and it is recorded that the flash mode selection switch 10 has been operated once. Next, in the step S304, a timer that times a period of about 2 seconds is started, and in the next decision step S305 the ON/OFF state of the flash mode selection switch 10 is queried. If the flash mode selection switch 10 is still ON, the flow of control proceeds to the step S306, while if it is OFF the flow of control jumps to the step S317 in the FIG. 8C flow chart. In the step S306, a decision is made as to whether the timer has run out or not, and if it has then the flow of control proceeds to the next step S307, while if the timer has not yet run out the flow of control returns to the step S305 to loop around again.

In the step S307, the correction mode flag is set, and then in the next step S308 the upper left segment of the LCD display device 2 is caused to flash. Finally the flow of control returns to the FIG. 5A flow chart of the main routine.

The date and/or time data are displayed on the upper portion of the LCD display device 2 and are, in each of the available formats, divided into three blocks of two decimal digits each, located at the upper left, upper middle, and upper right of the display respectively. In correction mode for the clock data, correction (setting) is performed in order for the left data block, the middle data block, and the right data block. When first the system enters into the correction mode, first the left block is flashed, which indicates that correction of the contents of the left block is now possible. For example, if in the selection mode the format "YMD" was selected, so that the number for the year is shown in the left block, the figure for the month is shown in the middle block, and the figure for the day is shown in the right block, then in the correction mode first the number for the year shown in the left block is flashed, which indicates that correction of this year datum is now possible.

If in the decision step S302 it is determined that the correction mode has already been entered into, the flow of control is transferred to the decision step S312 of FIG. 8B, in which a decision is made as to whether or not the upper right block of the LCD display device 2 is currently flashing. If this upper right block is already flashing, this is taken to mean that all of the blocks of date/time data for the clock have already been subjected to the correction procedure which has therefore been completed, and accordingly the flow of control is transferred to the step S314, in which the flashing of the LCD display device 2 is terminated, and then to the step S315, in which the flag for the correction mode for the clock data is reset and the correction mode is exited. After this, in the step S316, a decision is made as to whether the flash mode selection switch 10 is ON or OFF, and if it is still ON then the flow of control returns back to this step S316 to loop around in a tight loop, until said flash mode selection switch 10 is turned OFF, when the flow of control returns to the FIG. 5A flow chart of the main routine.

On the other hand, if in the step S312 it is decided that the upper right block of the LCD display device 2 is not the one which is flashing, then the flow of control passes to the step S313, in which the display block and corresponding date/time data block which are being corrected are changed over. In detail, if currently it is the upper left block of the LCD display device 2 which is flashing, then this flashing is terminated and the upper middle block thereof is caused to start flashing; while if currently it is the upper middle block of the LCD display device 2 which is flashing, then this flashing is terminated and the upper right block thereof is caused to start flashing. Then the flow of control is transferred to the step S316, in which as before the system waits until the flash mode selection switch 10 is turned OFF before returning to the FIG. 5A flow chart of the main routine.

On the other hand, if in the decision step S305 the flash mode selection switch 10 is found to be OFF the flow of control jumps to the step S317 in the FIG. 8C flow chart, in which a decision is made as to whether the flag A is set (equal to unity) or not. If the flag A is reset (equal to zero) then this is the second or a subsequent time that the flash mode selection switch 10 has been actuated, and the flow of control proceeds to the step S318, in which a timer that times a period of about five seconds is started. On the other hand, if the flag A is set (equal to unity) this means that this is the first time that the flash mode selection switch 10 has been actuated, and the flow of control proceeds to the step S319, in which a timer that times a period of about two seconds is started. Next, in the step S320, the ON/OFF state of the flash mode selection switch 10 is queried. If the flash mode selection switch 10 is ON, the flow of control proceeds to the step S321, while if it is OFF the flow of control proceeds to the step S323. When the flash mode selection switch 10 has been operated for a second time within two seconds from the first time it has been operated, in the step S321 the flag A is reset (set to zero) and the flow of control proceeds to the step S322, in which the display format selection mode for the imprint mode is entered, and changeover processing for the display format is performed.

Figure 12:
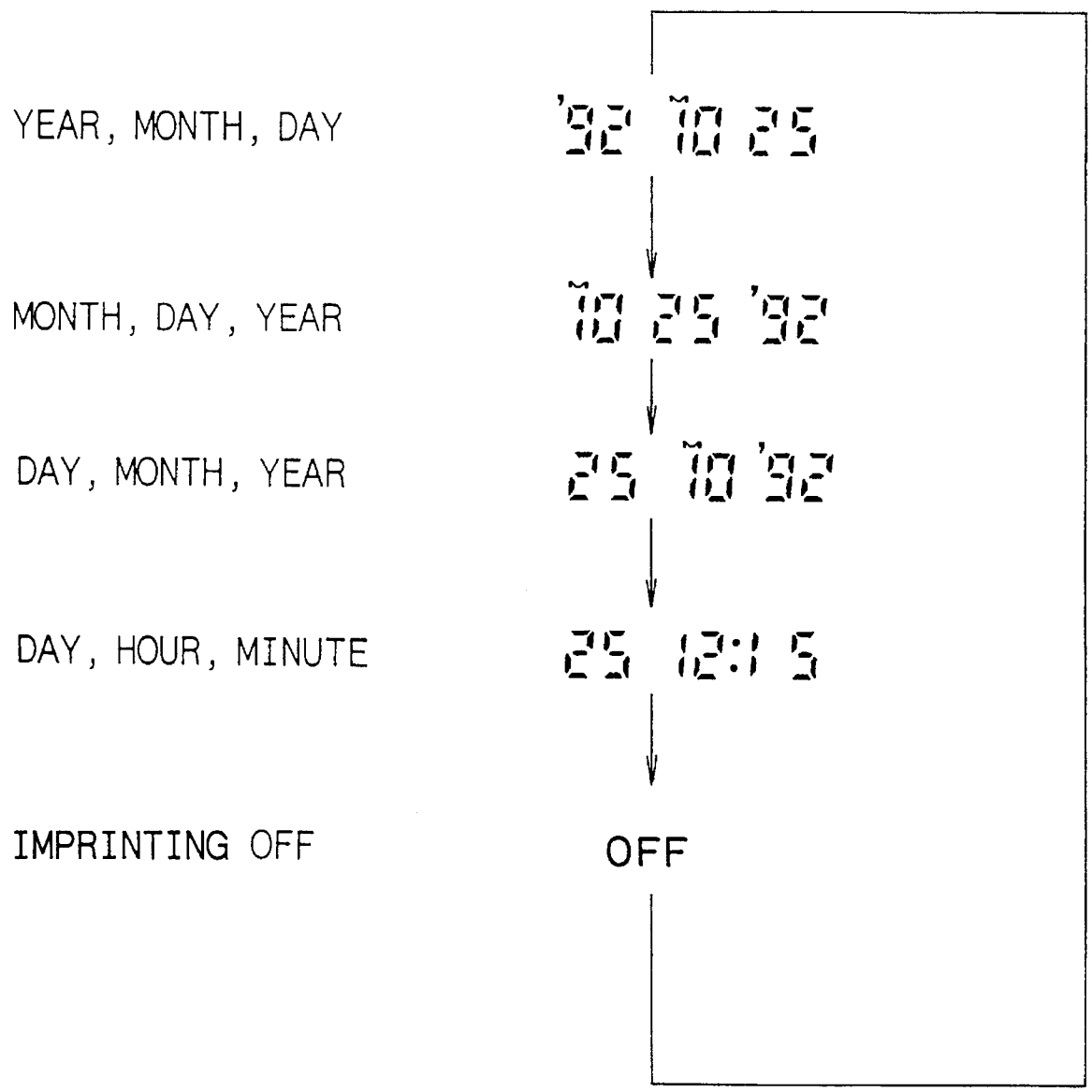
FIG. 12 is a figure showing the changeover cycle for imprint data selection mode.

The changeover cycle for the display format for the imprint mode is shown in FIG. 12. The system changes over the imprint mode display format to the next value therefor in sequence, according to the cycle shown in FIG. 12. Thus: if the present imprint mode display format is "YMD" (yearmonth-day), the system changes this format over to "MDY" (month-day-year); if the present imprint mode display format is "MDY" (month-day-year), the system changes this format over to "DMY" (day-month-year); and so on, as shown in FIG. 12.

If, after the flash mode selection switch 10 has been pressed once, the system has waited for two seconds without it being pressed for a second time, then the flow of control passes to the step S323, in which a decision is made as to whether any one or more of the main switch 9, the lens barrel position detection switch 14, and the battery compartment lid switch 15 is ON. If any one of these switches is ON, the flow of control returns to the FIG. 5A flow chart of the main routine, in order to perform the appropriate processing relating to that one of the switches which has been thus turned ON; but, if all of these switches are OFF, then the flow of control proceeds to the decision step S324, in which a decision is made as to whether or not the timer (which was started in the step S318 for a period of about five seconds or in the step S319 for a period of about two seconds) has run out. If the timer has run out, then the flow of control returns to the FIG. 5A flow chart of the main routine; while, if the timer has not yet run out, then the flow of control returns to loop back to the decision step S320 again.

FIG. 9 is a flow chart showing the details of the mode select switch processing routine which was summarized as the step S109 of FIG. 5B.

The microcomputer 1 executes this routine when the photographic mode select switch 11 is turned on. First, in the step S401, a decision is made as to whether or not the barrel of the photographic lens of the camera is in its retracted position, based upon the output from the lens barrel position detection switch 14, and if the lens barrel is retracted the flow of control passes to the step S402, while if it is not then the flow of control is transferred to the step S406.

Figure 13:
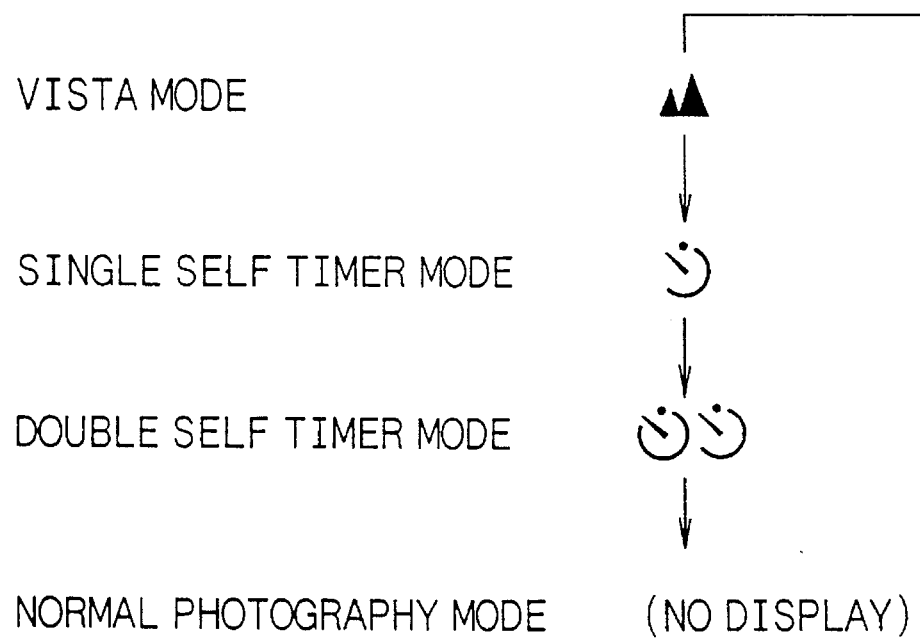
FIG. 13 is a figure showing the changeover cycle for photographic mode.

When the photographic lens barrel is not in the retracted position, changeover of the photographic mode is performed. The changeover cycle for the photographic mode is shown in FIG. 13. The system changes over the photographic mode to the next value therefor in sequence, according to the cycle shown in FIG. 13. Thus: if the present photographic mode is vista mode, the system changes over to single self timer mode; if the present photographic mode is single self timer mode, the system changes over to double self timer mode; if the present photographic mode is double self timer mode, the system changes over to normal photography mode; and, if the present photographic mode is normal photography mode, the system changes over to vista mode. At this time, those symbols on the LCD display device 2 which are appropriate to that photographic mode which has been terminated and to that one which has been commenced are turned off and on respectively, as schematically shown towards the right side of FIG. 13. After the changing over of the photographic mode, the flow of control passes to the decision step S407, which loops around in a tight loop while the photographic mode select switch 11 is ON; and when said photographic mode select switch 11 is turned OFF the flow of control returns to the FIG. 5B flow chart of the main routine.

On the other hand, if the photographic lens barrel is in the retracted position, in the step S402 a decision is made as to whether or not the system has already gone into the correction mode. If the system is already in the correction mode, then the flow of control passes next to the step S403, while if not the flow of control skips to the decision step S404. If the system is not in the correction mode, then in the step S404 the system loops around in a tight loop until the photographic mode select switch 11 is OFF, when the flow of control returns to the FIG. 5B flow chart of the main routine. On the other hand, if the system is already in the correction mode, then in the step S403 the clock data is corrected. In detail, the contents of that one of the upper left block, the upper middle block, and the upper right block of the LCD display device 2 which is flashing are increased by 1. For example, when the display mode is "YMD" (year-month-day), and if it is the upper left block on the display (currently therefore representing the year) which is flashing, and if the current value shown on that upper left block is "94", then this value is increased by 1 to "95", and the flashing thereof is continued. After this step, the flow of control continues to the step S404, in which as before the system loops until the photographic mode select switch 11 is OFF, and then returns to the main routine.

FIGS. 10A and 10B are flow charts showing the details of the photographic processing routine which was summarized as the step S110 of FIG. 5B.

The microcomputer 1 executes this routine when the first stroke switch 12 is turned on. First, in the step S501, a decision is made as to whether or not the barrel of the photographic lens of the camera is in its retracted position, based upon the output from the lens barrel position detection switch 14, and if the lens barrel is retracted, since photography is impossible in this condition, the flow of control returns to the main routine; while, if the lens barrel is not retracted, the flow of control passes to the step S502 and the following steps so as to perform photography. In the step S502, the microcomputer 1 controls the photometric circuit 4 and measures the brightness of the object to be photographed, and in the next step S503 it controls the distance measurement circuit 5 so as to measure the photographic distance. Next, in the decision step S504, a decision is made as to whether or not flash illumination is required for photography, based upon the brightness and the distance of the object to be photographed as determined above. If the current flash photographic mode is the automatic flash mode, it is deemed that flash illumination is required when the detected brightness is less than a predetermined value. Further, flash illumination is never supplemented if the current flash photographic mode is the flash inhibit mode, whatever may be the brightness which is detected. Yet further, flash illumination is always supplemented if the current flash photographic mode is the forced flash mode, whatever may be the brightness which is detected. If in the decision step S504 it is decided that flash illumination is required the flow of control passes to the step S516, while if it is decided that no flash illumination is required the flow of control passes to the step S505.

For photography using flash illumination, in the step S516 a decision is made as to whether or not the charging of the flash device has been completed or not, and if the charging is complete the flow of control passes to the step S505, while if the charging is not complete the flow of control passes to the step S517. When the charging of the flash device has not yet been completed, in the step S517 the system loops, waiting until the first stroke switch 12 is turned OFF, and then returns to the main routine, so that in this case photography is not performed. On the other hand, if the charging of the flash device has been completed so that preparation for flash photography has been completed, or (in the NO branch from the decision step S504) if no flash illumination is required, then the flow of control reaches the decision step S505, and here the state of the second stroke switch 13 is queried. If the second stroke switch 13 is ON the flow of control proceeds to the step S507, while if the second stroke switch 13 is OFF the flow of control proceeds to the step S506. When the shutter is not being released by the shutter release button being second stroke pressed so as to turn said second stroke switch 13 ON, i.e. in the step S506, the state of the first stroke switch 12 is queried. If the first stroke switch 12 continues to be ON, then the flow of control loops back to the step S505 again, while if the first stroke switch 12 is OFF then the flow of control returns to the FIG. 5B main routine.

When on the other hand the shutter is being released so that the second stroke switch 13 is ON, in the step S507 a decision is made as to whether the current photographic mode is a self timer mode (either single or double), and if it is then in the step S508 the system waits for a period of about 10 seconds before proceeding to the next step S509, while if the current photographic mode is not a self timer mode then the flow of control skips past this step S508 to arrive at the step S509 directly. In the step S509, the photographic lens is driven by a lens drive device not shown in the figures to its proper position, based upon the photographic distance detected in the above described step S503. In the next step S510, the shutter is opened and then closed at an appropriate timing so as to expose the current film frame. At this time, if flash illumination is required for photography, the flash device is caused to emit light. If this happens, then the recharging of the flash device is immediately commenced as soon as the emission of light has stopped, so that said flash device should be ready for the next flash illumination episode as soon as possible. Next, in the step S511, the photographic lens is returned to its initial position by the operation of the lens drive device, and the flow of control proceeds to the step S512, in which a decision is made as to whether or not the current data imprint mode is OFF. If the data imprint mode is OFF, the flow of control skips the next step S513 and jumps directly to the step S514, but otherwise the flow of control is passed to the step S513. Here, the currently set imprint data is imprinted onto the current film frame by the data imprinting circuit 7. In the next step S514 winding on of the film is performed by the film winding circuit 6, and in the next step S515 the first stroke switch 12 is queried. While said first stroke switch 12 continues to be ON, the flow of control loops back to the step S515 again, to wait until said switch 12 goes OFF, when the flow of control returns to the FIG. 5B main routine.

By the camera according to this first preferred embodiment of the present invention functioning in the manner described above, when the changing over of the battery is detected, temporarily imprinting of the imprint data is prevented, and when the clock data has been reset this prevention of data imprinting is ceased. Thereby it is possible to prevent a mistaken date and time of photography being imprinted on the film, even if the user of the camera forgets to reset the clock data after changing the battery, and it is possible to ensure that a correct date and time of photography are always recorded.

Preferred Embodiment 2

Figure 15:
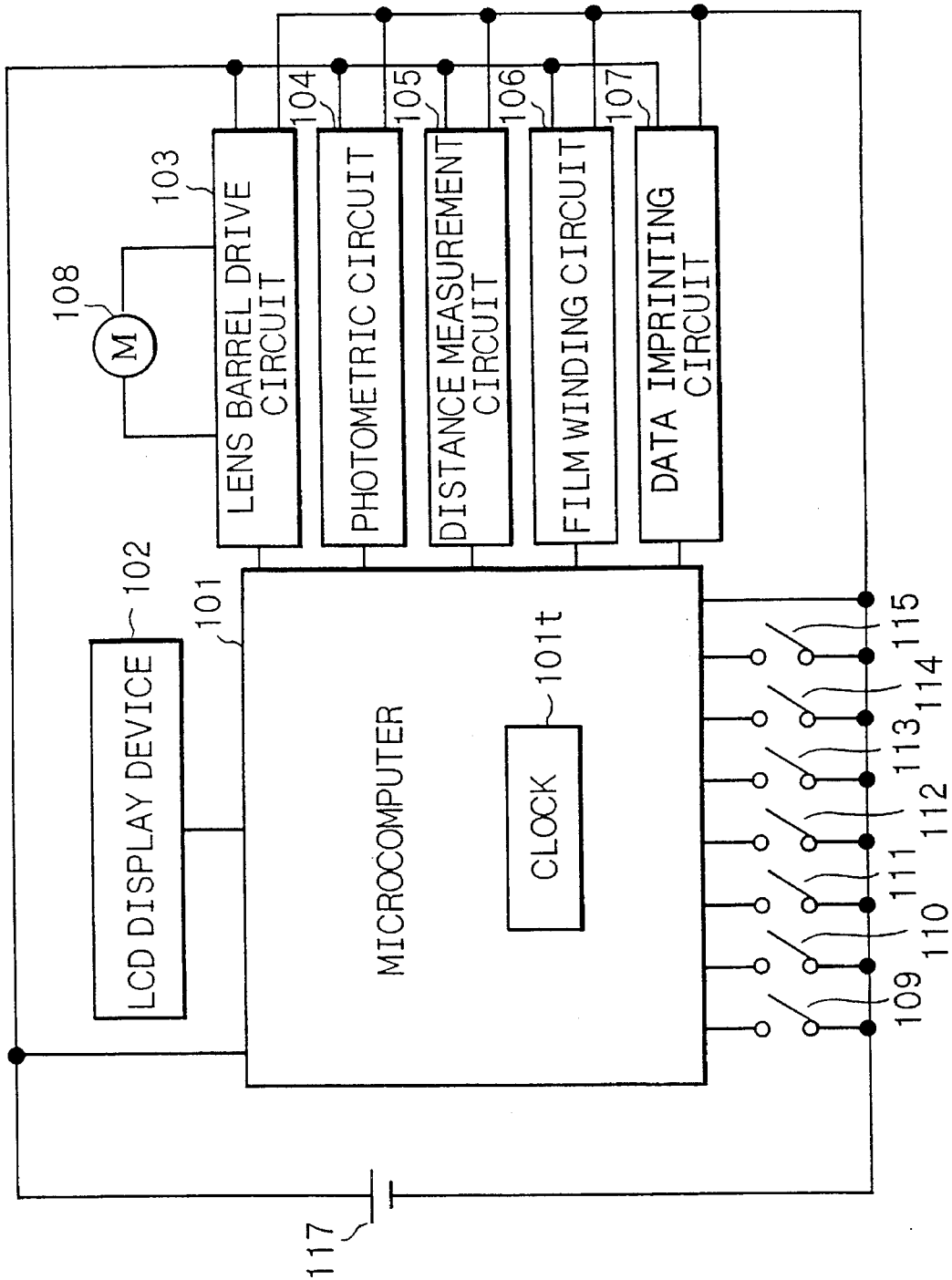
FIG. 15 is a functional block diagram showing the construction of a camera which is the second preferred embodiment of the present invention.

FIG. 15 is a functional block diagram showing the construction of a camera which is the second preferred embodiment of the present invention.

A microcomputer 101 comprises a clock 101$t$ which outputs clock data consisting of the current date and the current time, and performs various calculations for sequence control of the camera by executing various control programs which will be described hereinafter. A liquid crystal (LCD) display device 102, a lens barrel drive circuit 103, a photometric circuit 104, a distance measurement circuit 105, a film winding circuit 106, a data imprinting circuit 107, and switches 109 through 115 are connected to the microcomputer 101.

The LCD display device 102 is provided on the upper surface of the camera body, and displays information related to photography such as various photographic modes and imprint data and the like, according to a display command signal which it receives from the microcomputer 101. The lens barrel drive circuit 103 actuates a motor 108 to move the barrel of the photographic lens from its retracted position to the proper position for photography, according to a lens drive signal which it receives from the microcomputer 101. The photometric circuit 104 measures the brightness of the object to be photographed according to a command signal which it receives from the microcomputer 101, and outputs a value representative of the measured brightness to the microcomputer 101. And the distance measurement circuit 105 measures the photographic distance to the object to be photographed according to a command signal which it receives from the microcomputer 101, and outputs a value representative of the measured distance to the microcomputer 101.

The film winding circuit 106 performs winding on or rewinding of the film loaded in the camera, according to a film winding command signal which it receives from the microcomputer 101. The data imprinting circuit 107 imprints various information such as the date and/or the time of photography upon each frame of the film as it is shot, according to a film imprinting signal which it receives from the microcomputer 101. Further, in this second preferred embodiment of the present invention, it is supposed that the data imprinting mode can be set either to a selection mode or a correction mode, and that in this selection mode any one of the data imprinting formats "YMD" (year-month-day), "MDY" (month-day-year), "DMY" (day-month-year), "DHM" (day-hour-minute), or "OFF" (no imprinting) can be selected, while in the correction mode the setting on the clock 101$t$ for the current date and the current time can be corrected. A battery 117 supplies operating electrical power to all of the circuits and equipment of this camera, including the microcomputer 101, the clock 101$t$, the lens barrel drive circuit 103, the photometric circuit 104, the distance measurement circuit 105, the film winding circuit 106, and the data imprinting circuit 107 and the like.

The switch 109 is a main switch for starting all of the various operations of the camera, while the switch 110 is a mode selection switch for selecting the various flash photography modes. In this second preferred embodiment of the present invention, it is supposed that there are five types of flash photography mode available: automatic flash mode, red eye reduction mode, flash inhibit mode, forced flash mode, and slow synchro mode. Further, this flash mode selection switch 110 is also used in the clock data correction mode as a switch for changing over the data block which is to be the subject of correction, as will be explained hereinafter. The switch 111 is a mode select switch for selecting the photographic mode. In this second preferred embodiment, it is supposed that the following photographic modes are available: normal photography mode, vista photography mode, single self timer photography mode, and double self timer photography mode. Further, this photographic mode select switch 111 is also used in the clock data correction mode as a switch for correcting the data on the clock 101$t$, as will be explained hereinafter. The switch 112 is a first stroke switch which is turned on when a shutter release button, not shown, of the camera is pressed by the camera operator as far as a first stroke position thereof, while the switch 113 is a second stroke switch which is turned on when said shutter release button is pressed by the camera operator as far as a second stroke position thereof. And the switch 114 is a lens barrel position detection switch which is turned off when the barrel of the photographic lens is in its retracted position and is turned on when said lens barrel is moved to any position for photography, while the switch 115 is a battery compartment lid switch which is turned on when a lid (not particularly shown) of a compartment (not shown either) in the camera body in which the battery 117 is received is in its open position, and is turned off when said battery compartment lid is in its closed position.

Figure 16:
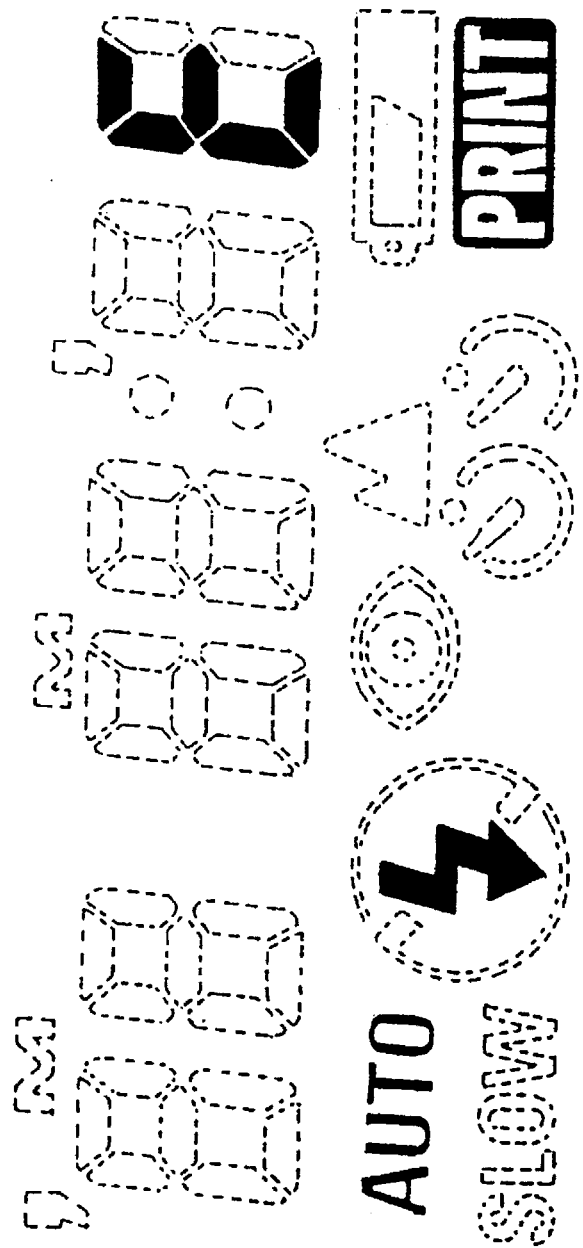
FIG. 16 is a figure showing an exemplary display on a liquid crystal display device included in this second preferred embodiment.
Figure 17:
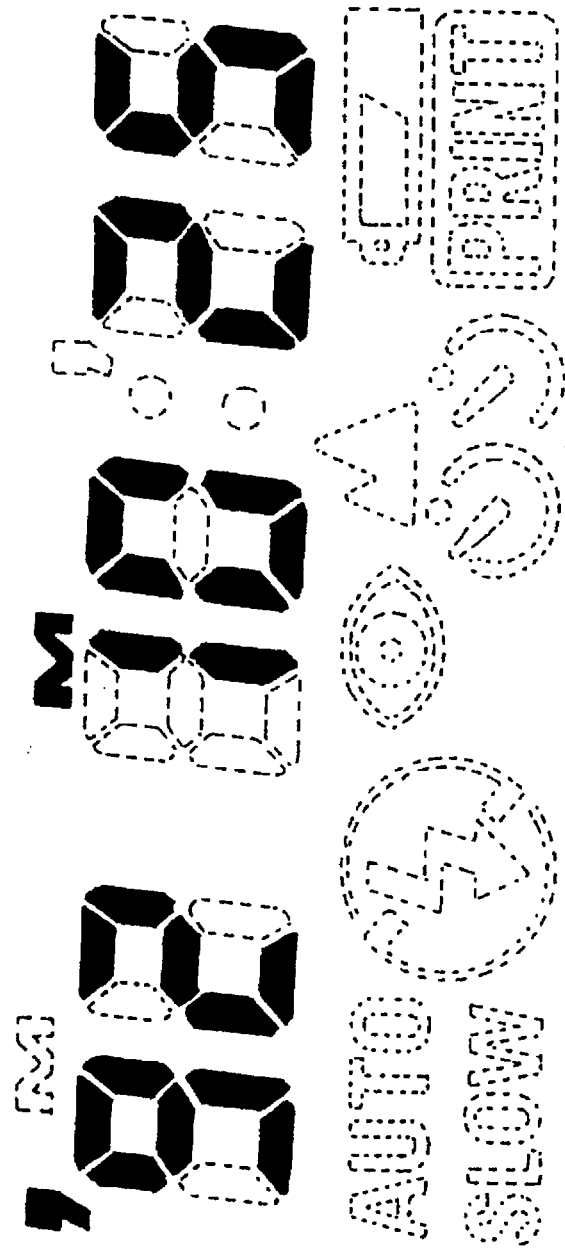
FIG. 17 is a figure showing another exemplary display on said liquid crystal display device included in this second preferred embodiment.

FIGS. 16 and 17 are figure showing exemplary displays on the liquid crystal display device 102. FIG. 16 is an example in which the current film frame number is being displayed on the upper portion of the liquid crystal display device 102, while symbols representative of flash photography mode, self timer mode, date imprint mode (PRINT), remaining battery charge, and the like are being displayed upon its lower portion. FIG. 17 is an example in which the date (in year-month-day format) is being shown on the upper portion of the LCD display device 2. Thus, the upper portion of the liquid crystal display device 102 alternatively displays either date/time data output from the clock or the film frame number. Moreover, the symbol PRINT is displayed when the data imprint mode is set, while the symbol PRINT is turned out when data imprinting is inhibited (the data imprint mode is not set).

Figure 18A:
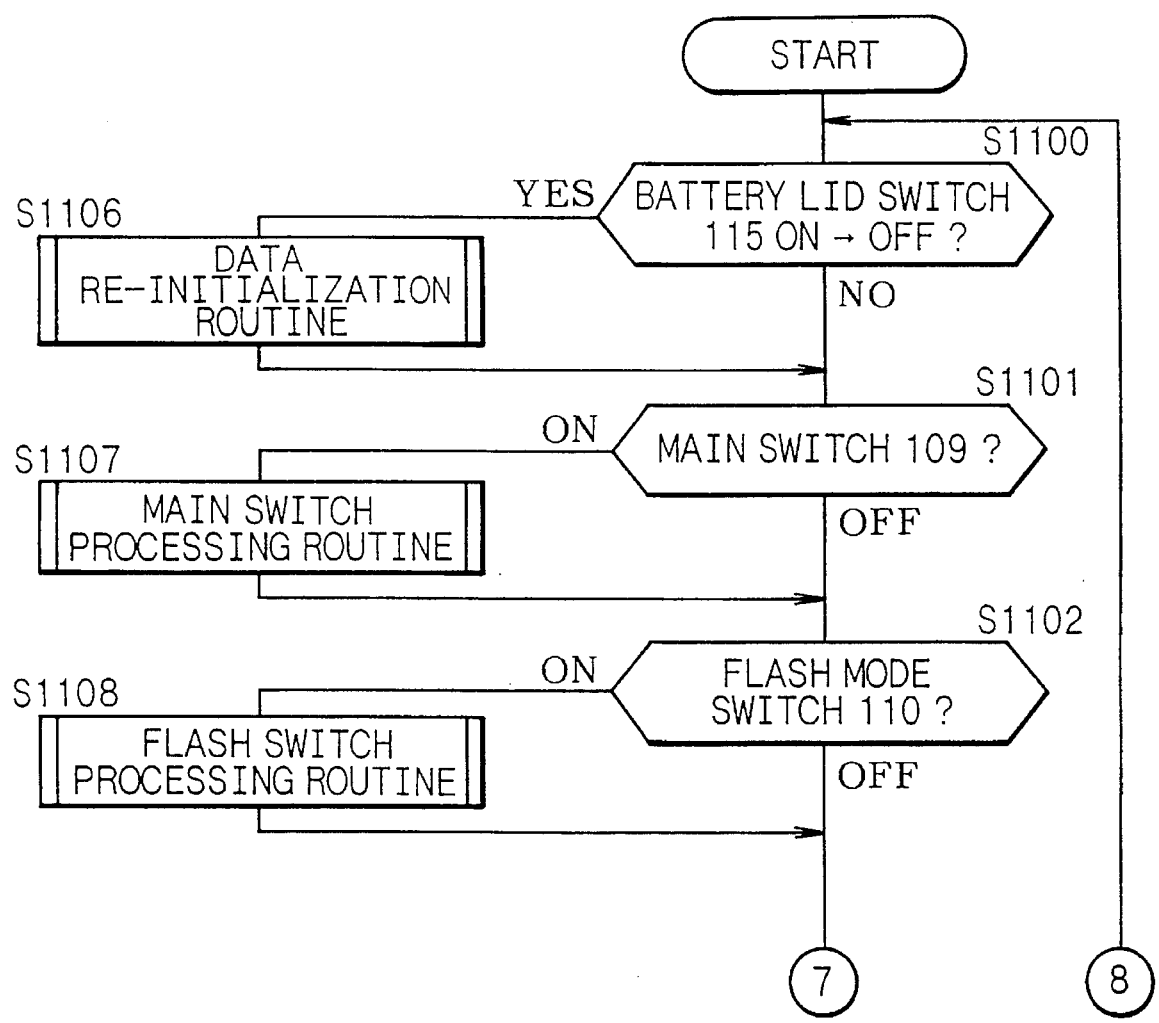
FIGS. 18A and 18B are flow charts showing a main program for a microcomputer included in this second preferred embodiment.
Figure 18B:
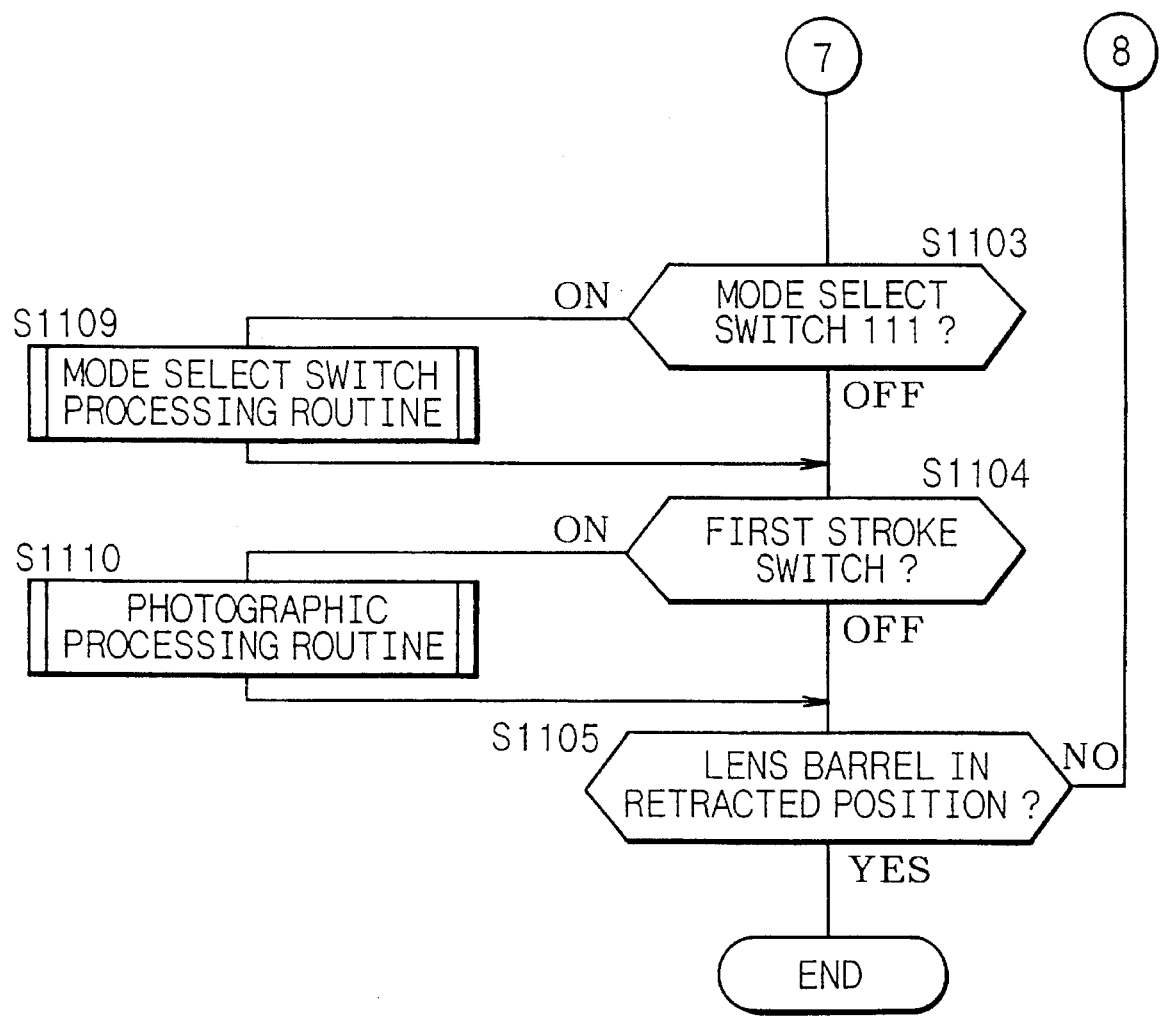

FIGS. 18A and 18B are flow charts showing the main program for the microcomputer 101. The operation of this second preferred embodiment of the present invention will now be explained with reference to these flow charts.

Figure 19:
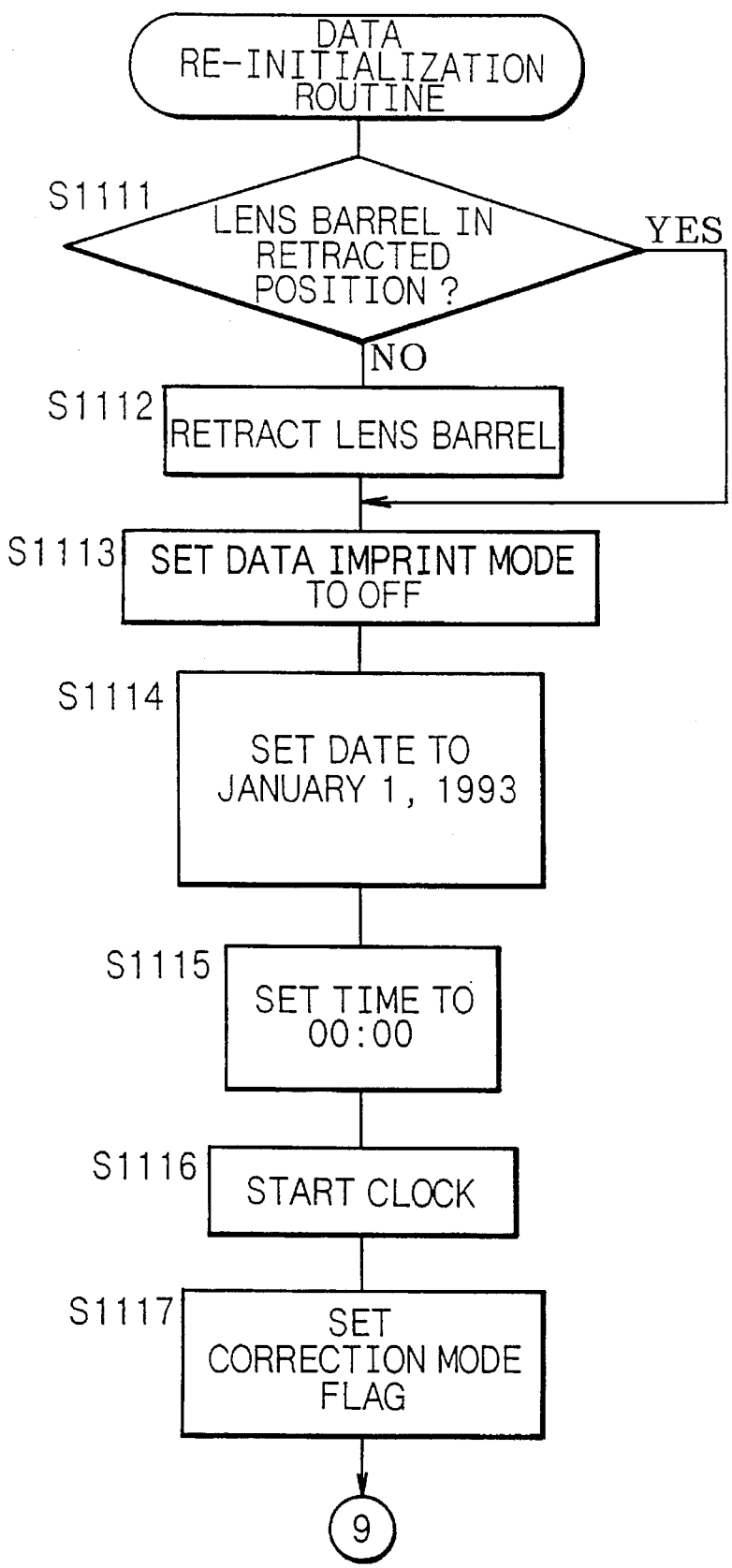
FIG. 19 is a flow chart showing a data re-initialization routine for this microcomputer of this second preferred embodiment.
Figure 20:
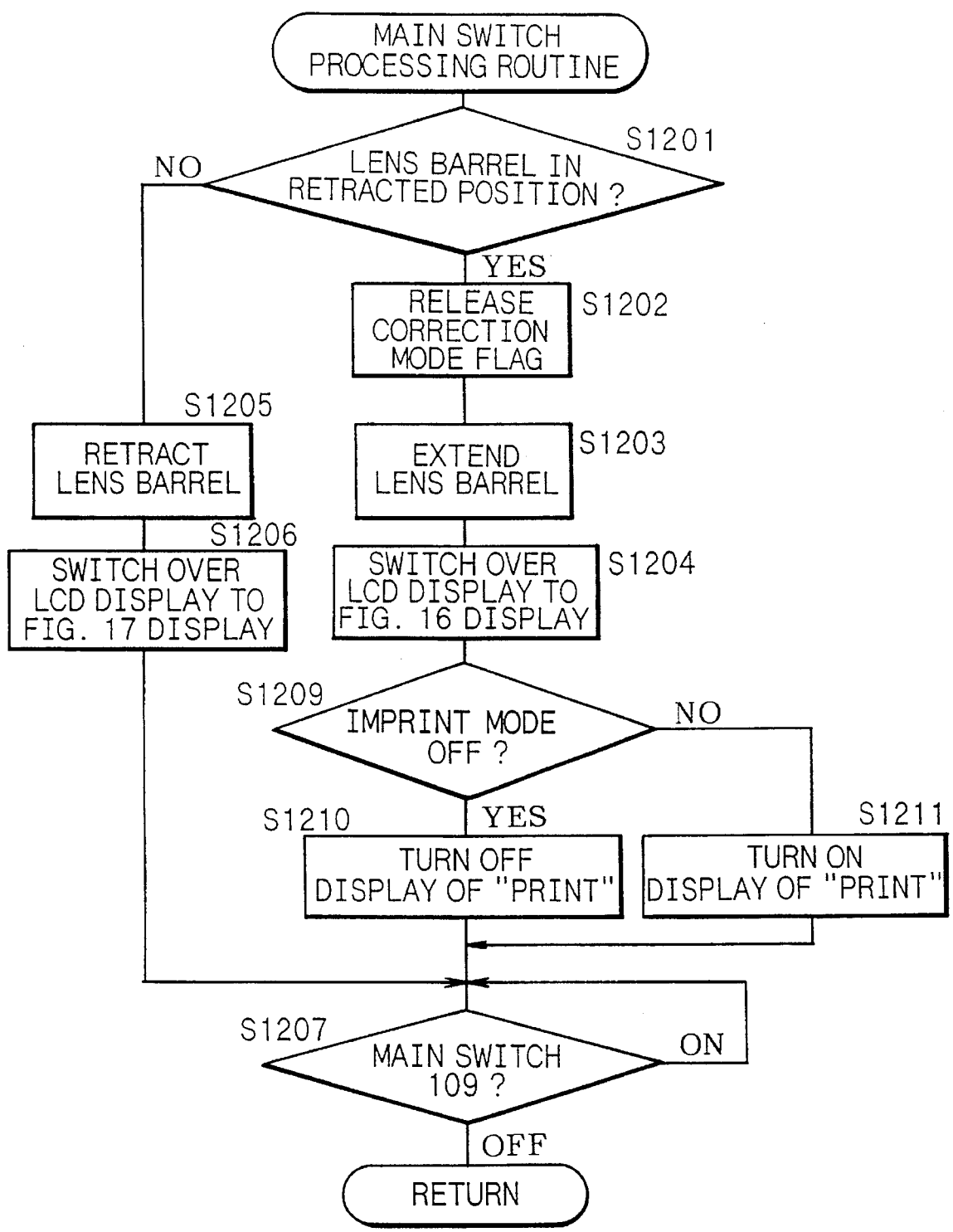
FIG. 20 is a flow chart showing a main switch processing routine for this second preferred embodiment microcomputer.
Figure 21A:
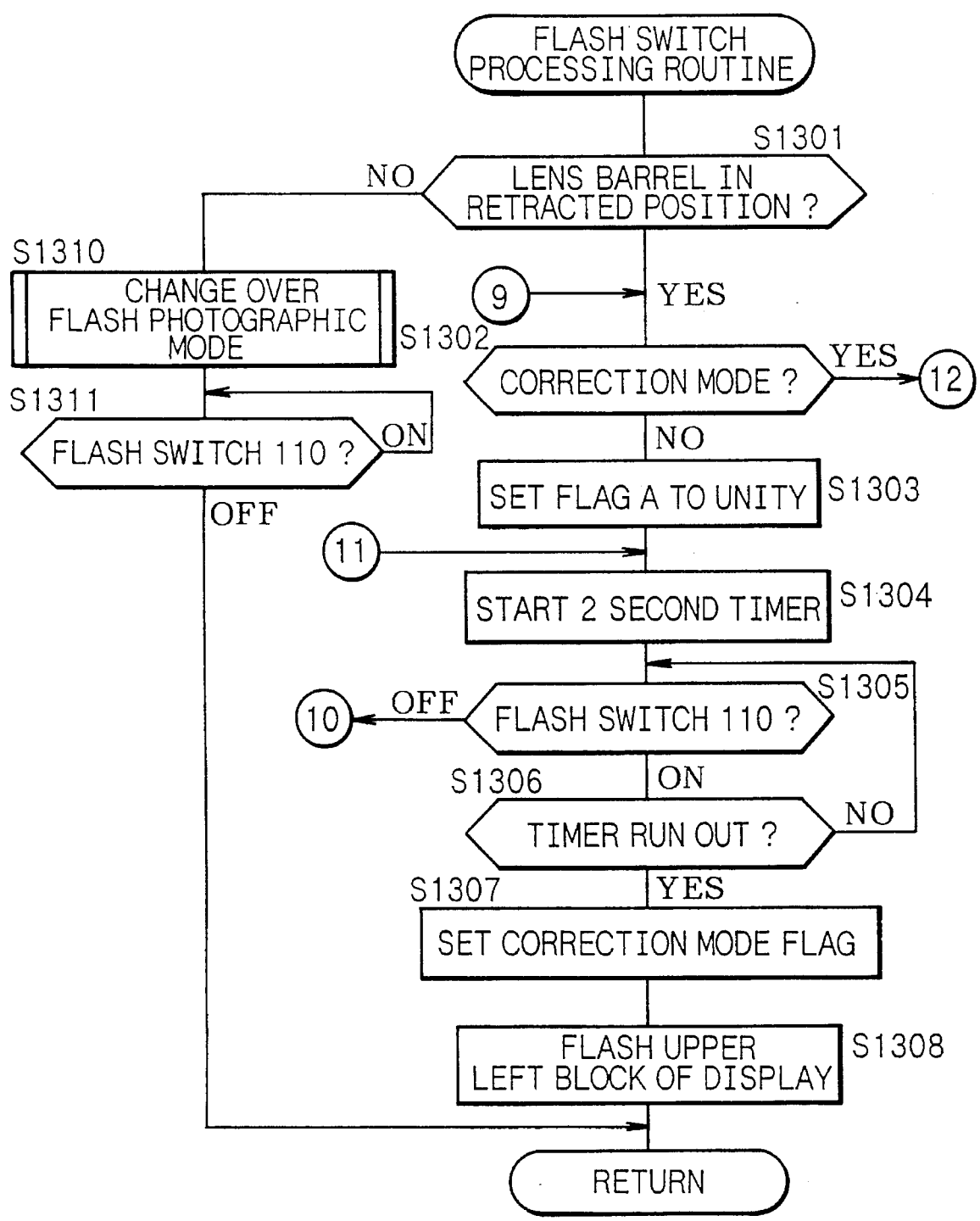
FIGS. 21A, 21B, and 21C are flow charts showing a flash switch processing routine for this second preferred embodiment microcomputer.
Figure 21B:
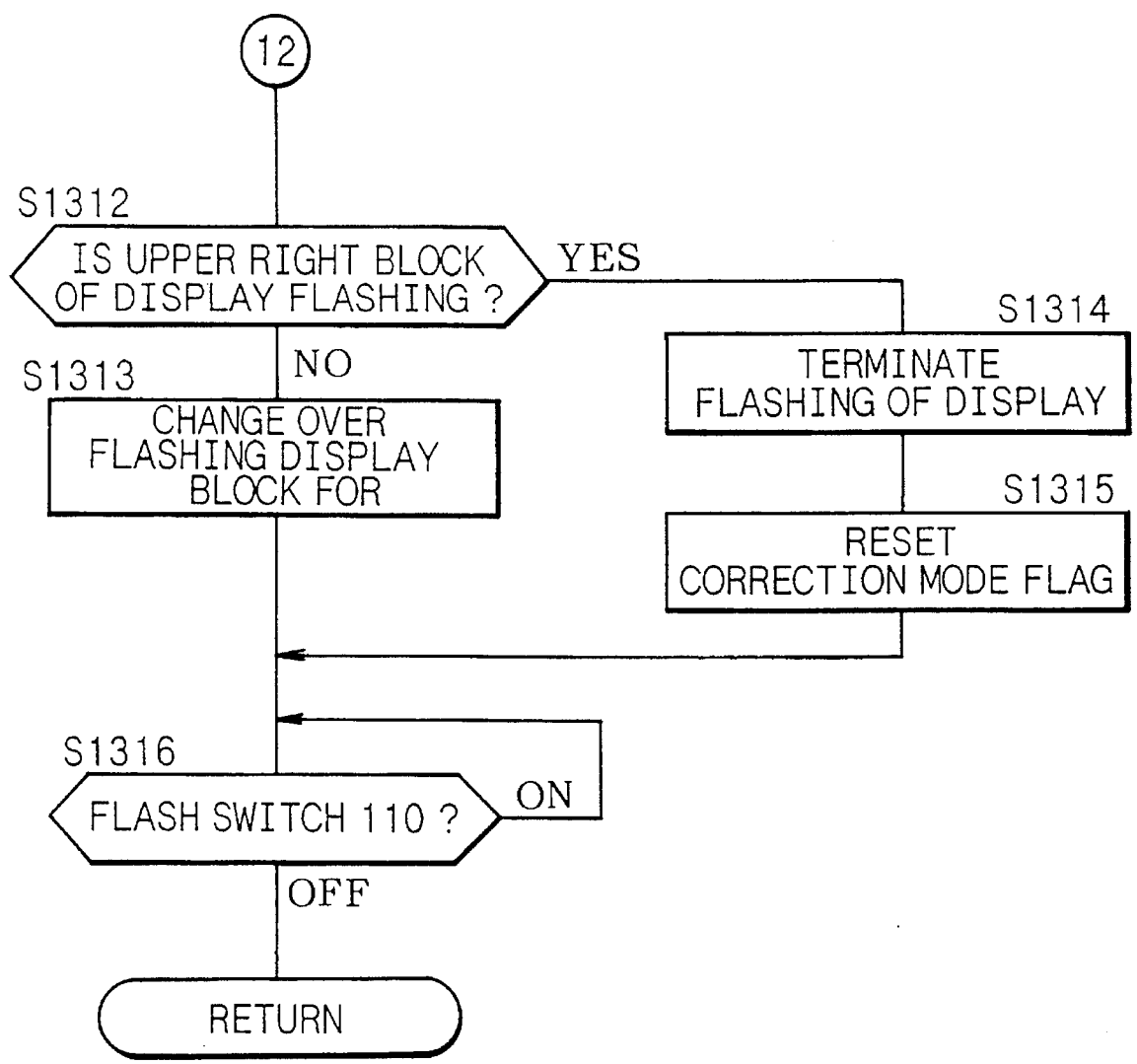
Figure 21C:
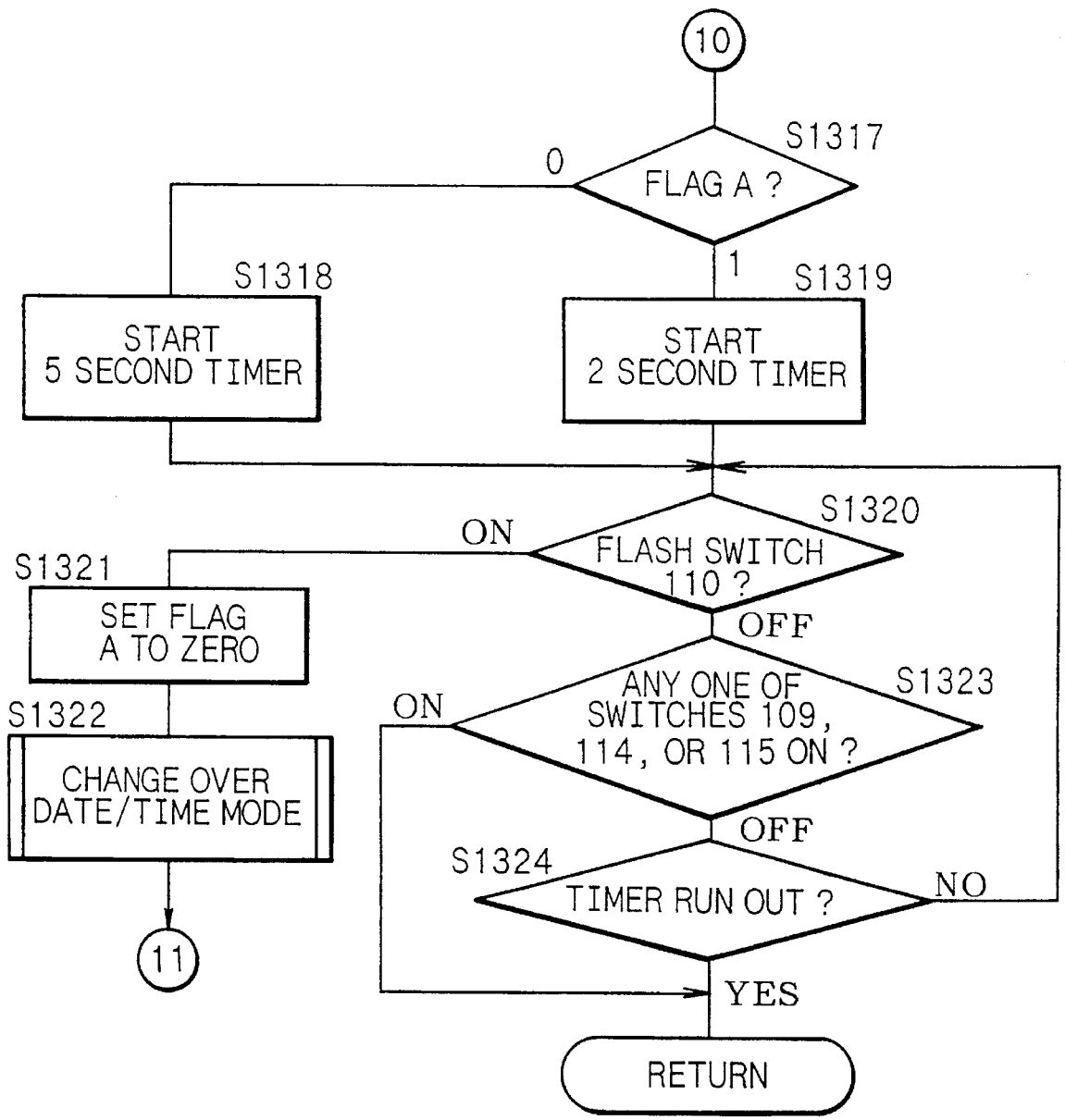

After the START of this program, in the decision step S1100 the microcomputer 101 makes a decision as to whether or not the battery compartment lid switch 115 has transited from the ON state to the OFF state, and if the result of this decision is YES then this indicates that the battery compartment lid has been closed from the open condition and means that the changing of the battery has been performed, and the flow of control proceeds to the step S1106, while if the result is NO this indicates that the changing of the battery has not been performed, and the flow of control proceeds to the decision step S1101. When it is decided that the changing of the battery has been performed, in the step S1106 the data re-initialization routine whose flow chart is shown in FIG. 19 and which will be described hereinafter is executed. Next, in the decision step S1101, a decision is made as to whether or not the main switch 109 is ON, and if it is then the flow of control is transferred to the step S1107, while if said main switch 109 is OFF then the flow of control passes next to the decision step S1102. When it is decided that the main switch 109 is ON, in the step S1107 the main switch processing routine whose flow chart is shown in FIG. 20 and which will be described hereinafter is executed. Next, in the decision step S1102, a decision is made as to whether or not the flash mode selection switch 110 is ON, and if it is then the flow of control is transferred to the step S1108, while if said flash mode selection switch 110 is OFF then the flow of control passes next to the decision step S1103. When it is decided that the flash mode selection switch 110 is ON, in the step S1108 the flash switch processing routine whose flow chart is shown in FIGS. 21A, 21B, and 21C and which will be described hereinafter is executed.

Figure 22:
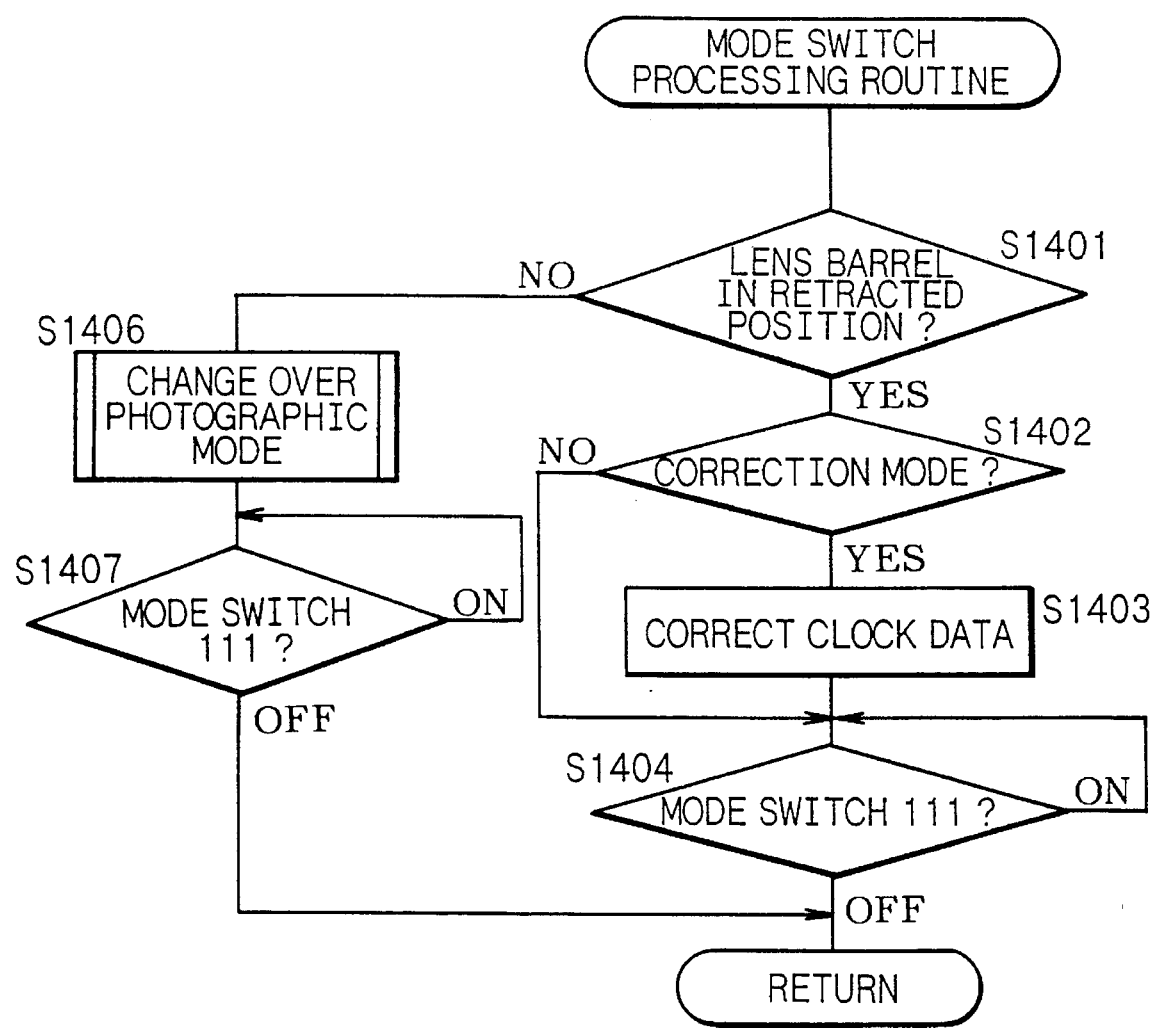
FIG. 22 is a flow chart showing a mode switch processing routine for this second preferred embodiment microcomputer.
Figure 23A:
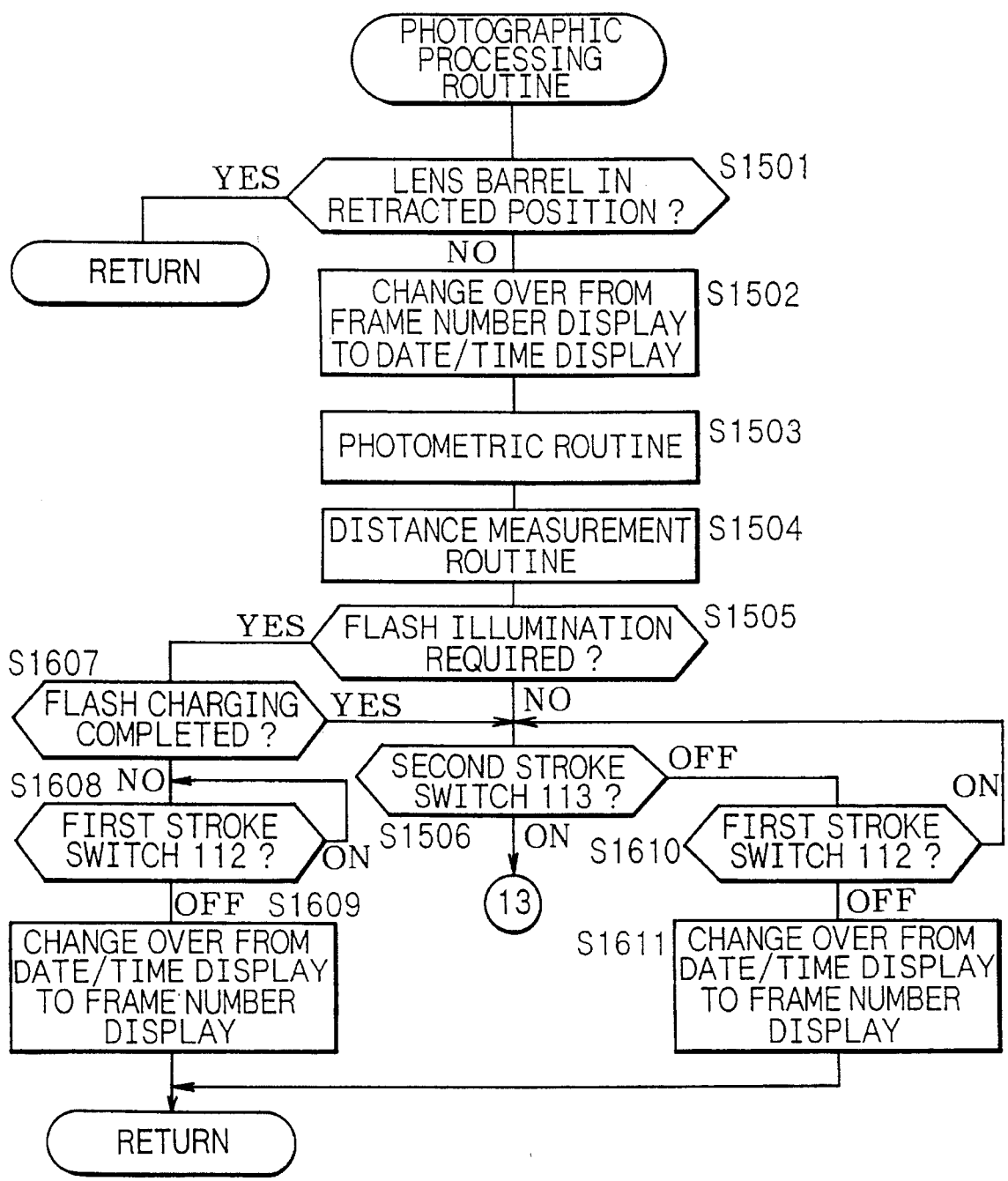
FIGS. 23A and 23B are flow charts showing a photographic processing routine for this second preferred embodiment microcomputer.
Figure 23B:
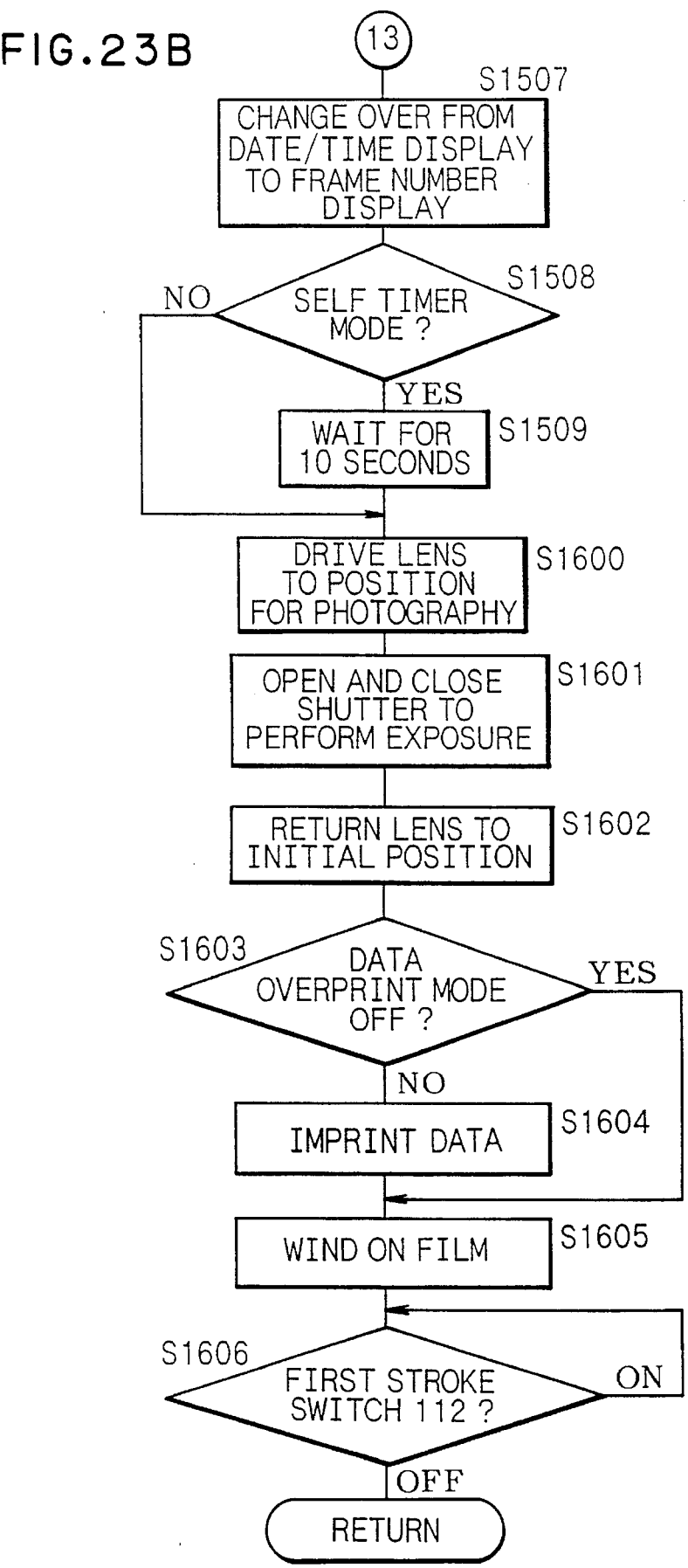

Next, in the decision step S1103, a decision is made as to whether or not the photographic mode select switch 111 is ON, and if it is then the flow of control is transferred to the step S1109, while if said photographic mode select switch 111 is OFF then the flow of control passes next to the decision step S1104. When it is decided that the photographic mode select switch 111 is ON, then in the step S1109 the mode select switch processing routine whose flow chart is shown in FIG. 22 and which will be described hereinafter is executed. Next, in the decision step S1104, a decision is made as to whether or not the first stroke switch 112 is ON, i.e. as to whether or not the shutter release button of the camera is being depressed by the photographer as far as its first stroke position, and if it is then the flow of control is transferred to the step S1110, while if said first stroke switch 112 is OFF then the flow of control passes next to the decision step S1105. When it is decided that the shutter release button is being depressed as far as its first stroke position, then in the step S1110 the photographic processing routine whose flow chart is shown in FIGS. 23A and 23B and which will be described hereinafter is executed. In the step S1105 a decision is made as to whether or not the lens barrel of the camera is in its retracted position, based upon the output from the lens barrel position detection switch 114, and if the camera lens barrel is currently retracted then execution of this main routine terminates, while if not then the flow of control returns to the decision step S1100 and the above described processing is repeated.

The details of the operation of the five routines mentioned above will now be explained with reference to the flow charts shown in FIGS. 19 through 23.

FIG. 19 is a flow chart showing the details of the data re-initialization routine which was summarized as the step S1106 of FIG. 18A.

The microcomputer 101 executes this routine when the battery compartment lid has been closed from the open condition. First, in the step S1111, a decision is made as to whether or not the lens barrel is in its retracted position, based upon the output from the lens barrel position detection switch 14, and if the lens barrel is retracted the flow of control skips to the step S1113, while if it is not then the flow of control passes to the step S1112, in which the microcomputer 101 controls the lens barrel drive circuit 103 so as to drive said barrel of the photographic lens to its retracted position, and then the flow of control proceeds to the step S1113. In this step S1113, the data imprint mode is set to OFF, so that data imprinting is prevented. In this second preferred embodiment of the present invention, when the data imprint mode is set to OFF, the current date is displayed on the LCD display device 102, as shown in FIG. 17. In the next step S1114, the date is set to a predetermined date. In this second preferred embodiment of the present invention, as in the first, the date is set to Jan. 1, 1993 ('93.1.1 in Y-M-D format). In the next step S1115, the time is set to a predetermined time. In this second preferred embodiment of the present invention, as in the first, the time is set to 00:00. And, in the next step S1116, the clock is started at this set date and time. Finally, in the step S1117, the correction mode flag is set, and then the flow of control is transferred to the step S1302 of the FIG. 21A routine.

FIG. 20 is a flow chart showing the details of the main switch processing routine which was summarized as the step S1107 of FIG. 18A.

The microcomputer 101 executes this routine when the main switch 109 is turned on. First, in the step S1201, a decision is made as to whether or not the barrel of the photographic lens of the camera is in its retracted position, based upon the output from the lens barrel position detection switch 114, and if the lens barrel is retracted the flow of control passes to the step S1202, while if it is not then the flow of control is transferred to the step S1205. When the barrel of the photographic lens is in its retracted position, in the step S1202 the flag indicating the correction mode for the clock data is released, and the flow of control passes to the step S1203, in which the microcomputer 101 controls the lens barrel drive circuit 103 so as to extend the lens barrel towards its proper position for photography. The flow of control passes next to the step S1204, in which the display on the LCD display device 102 is switched from the data display shown in FIG. 17 to the photographic mode display shown in FIG. 16. By doing this, the upper portion of the LCD display device 102 is caused to display the film frame number. In the next decision step S1209, a decision is made as to whether or not the data imprint mode is set to OFF, and if it is then the flow of control passes to the step S1210 in which the display of the symbol "PRINT" is turned off, while if the data imprint mode is not set to OFF then the flow of control passes to the step S1211 in which the display of the symbol "PRINT" is turned on. After either of these steps, the flow of control proceeds to the decision step S1207, which loops around in a tight loop while the main switch 109 of the camera is ON; and when said main switch 109 is turned OFF the flow of control returns to the FIG. 18A flow chart of the main routine.

On the other hand, if the result of the decision in the step S1201 is that the barrel of the photographic lens of the camera is not in its retracted position, the flow of control passes to the step S1205, in which the microcomputer 101 controls the lens barrel drive circuit 103 so as to retract the lens barrel back to its retracted position, and then the flow of control passes to the step S1206, in which the display on the LCD display device 102 is switched from the photographic mode display shown in FIG. 16 to the data display shown in FIG. 17. By doing this, the upper portion of the LCD display device 102 is caused to display the date or the time or a combination thereof. Then the flow of control proceeds to the step S1207, from which as before, when the main switch 109 is found to be OFF, the flow of control returns to the FIG. 18A flow chart of the main routine.

FIGS. 21A through 21C are flow charts showing the details of the flash switch processing routine which was summarized as the step S1108 of FIG. 18A.

The microcomputer 101 executes this routine when the flash mode selection switch 110 is turned on. First, in the step S1301, a decision is made as to whether or not the barrel of the photographic lens of the camera is in its retracted position, based upon the output from the lens barrel position detection switch 114, and if the lens barrel is retracted the flow of control passes to the step S1302, while if it is not then the flow of control is transferred to the step S1310.

When the barrel of the photographic lens is not in its retracted position, then in the step S1310 the system changes over the flash photographic mode to the next value therefor in sequence, according to the cycle shown in FIG. 11. Thus: if the present flash photographic mode is the automatic flash mode, the system changes over to the red eye reduction mode; if the present mode is the red eye reduction mode, the system changes over to the flash inhibit mode; if the present mode is the flash inhibit mode, the system changes over to the forced flash mode; if the present mode is the forced flash mode, the system changes over to the s low synchro mode; and, if the present mode is the s low synchro mode, the system changes over to the automatic flash mode. At this time, those symbols on the LCD display device 102 which are appropriate to that flash photographic mode which has been terminated and to that one which has been commenced are turned off and on respectively, as schematically shown towards the right side of FIG. 11. The flow of control then passes to the decision step S1311, which loops around in a tight loop while the flash mode selection switch 110 is ON; and when said flash mode selection switch 110 is turned OFF the flow of control returns to the FIG. 18A flow chart of the main routine.

On the other hand, if in the step S1301 it is decided that the barrel of the photographic lens of the camera is in its retracted position, then the flow of control passes onward in order to change over to the next block of clock data to be corrected, and a decision is made in the decision step S1302 as to whether or not the system has already gone into the correction mode. If the system is already in the correction mode, then the flow of control is transferred to the step S1312 of the FIG. 21B flow chart, while if not the flow of control passes next to the step S1303. If the system is not in the correction mode then it is in the so called selection mode, and in the step S1303 a flag A is set to unity and it is recorded that the flash mode selection switch 110 has been operated once. Next, in the step S1304, a timer that times a period of about 2 seconds is started, and in the next decision step S1305 the ON/OFF state of the flash mode selection switch 110 is queried. If the flash mode selection switch 110 is still ON, the flow of control proceeds to the step S1306, while if it is OFF the flow of control jumps to the step S1317 in the FIG. 21C flow chart. In the step S1306, a decision is made as to whether the timer has run out or not, and if it has then the flow of control proceeds to the next step S1307, while if the timer has not yet run out the flow of control returns to the step S1305 to loop around again.

In the step S1307, the correction mode flag is set, and then in the next step S1308 the upper left segment of the LCD display device 102 is caused to flash. Finally the flow of control returns to the FIG. 18A flow chart of the main routine.

The date and/or time data are displayed on the upper portion of the LCD display device 102 and are, in each of the available formats, divided into three blocks of two decimal digits each, located at the upper left, upper middle, and upper right of the display respectively. In correction mode for the clock data, correction (setting) is performed in order for the left data block, the middle data block, and the right data block. When first the system enters into the correction mode, first the left block is flashed, which indicates that correction of the contents of the left block is now possible. For example, if in the selection mode the format "YMD" was selected, so that the number for the year is shown in the left block, the figure for the month is shown in the middle block, and the figure for the day is shown in the right block, then in the correction mode first the number for the year shown in the left block is flashed, which indicates that correction of this year datum is now possible.

If in the decision step S1302 it is determined that the correction mode has already been entered into, the flow of control is transferred to the decision step S1312 of FIG. 21B, in which a decision is made as to whether or not the upper right block of the LCD display device 102 is currently flashing. If this upper right block is already flashing, this is taken to mean that all of the blocks of date/time data for the clock have already been subjected to the correction procedure which has therefore been completed, and accordingly the flow of control is transferred to the step S1314, in which the flashing of the LCD display device 102 is terminated, and then to the step S1315, in which the flag for the correction mode for the clock data is reset and the correction mode is exited. After this, in the step S1316, a decision is made as to whether the flash mode selection switch 110 is ON or OFF, and if it is still ON then the flow of control returns back to this step S1316 to loop around in a tight loop, until said flash mode selection switch 110 is turned OFF, when the flow of control returns to the FIG. 18A flow chart of the main routine.

On the other hand, if in the step S1312 it is decided that the upper right block of the LCD display device 102 is not the one which is flashing, then the flow of control passes to the step S1313, in which the display block and corresponding date/time data block which are being corrected are changed over. In detail, if currently it is the upper left block of the LCD display device 102 which is flashing, then this flashing is terminated and the upper middle block thereof is caused to start flashing; while if currently it is the upper middle block of the LCD display device 102 which is flashing, then this flashing is terminated and the upper right block thereof is caused to start flashing. Then the flow of control is transferred to the step S1316, in which as before the system waits until the flash mode selection switch 110 is turned OFF before returning to the FIG. 18A flow chart of the main routine.

On the other hand, if in the decision step S1305 the flash mode selection switch 110 is found to be OFF the flow of control jumps to the step S1317 in the FIG. 21C flow chart, in which a decision is made as to whether the flag A is set (equal to unity) or not. If the flag A is reset (equal to zero) then this is the second or a subsequent time that the flash mode selection switch 110 has been actuated, and the flow of control proceeds to the step S1318, in which a timer that times a period of about five seconds is started. On the other hand, if the flag A is set (equal to unity) this means that this is the first time that the flash mode selection switch 110 has been actuated, and the flow of control proceeds to the step S1319, in which a timer that times a period of about two seconds is started. Next, in the step S1320, the ON/OFF state of the flash mode selection switch 110 is queried. If the flash mode selection switch 110 is ON, the flow of control proceeds to the step S1321, while if it is OFF the flow of control proceeds to the step S1323. When the flash mode selection switch 110 has been operated for a second time within two seconds from the first time it has been operated, in the step S1321 the flag A is reset (set to zero) and the flow of control proceeds to the step S1322, in which the display format selection mode for the imprint mode is entered, and changeover processing for the display format is performed.

The changeover cycle for the display format for the imprint mode is shown in FIG. 12. The system changes over the imprint mode display format to the next value therefor in sequence, according to the cycle shown in FIG. 12. Thus: if the present imprint mode display format is "YMD" (year-month-day), the system changes this format over to "MDY" (month-day-year); if the present imprint mode display format is "MDY" (month-day-year), the system changes this format over to "DMY" (day-month-year); and so on, as shown in FIG. 12.

If, after the flash mode selection switch 110 has been pressed once, the system has waited for two seconds without it being pressed for a second time, then the flow of control passes to the step S1323, in which a decision is made as to whether any one or more of the main switch 109, the lens barrel position detection switch 114, and the battery compartment lid switch 115 is ON. If any one of these switches is ON, the flow of control returns to the FIG. 18A flow chart of the main routine, in order to perform the appropriate processing relating to that one of the switches which has been thus turned ON; but, if all of these switches are OFF, then the flow of control proceeds to the decision step S1324, in which a decision is made as to whether or not the timer (which was started in the step S1318 for a period of about five seconds or in the step S1319 for a period of about two seconds) has run out. If the timer has run out, then the flow of control returns to the FIG. 18A flow chart of the main routine; while, if the timer has not yet run out, then the flow of control returns to loop back to the decision step S1320 again.

FIG. 22 is a flow chart showing the details of the mode select switch processing routine which was summarized as the step S1109 of FIG. 18B.

The microcomputer 101 executes this routine when the photographic mode select switch 111 is turned on. First, in the step S1401, a decision is made as to whether or not the barrel of the photographic lens of the camera is in its retracted position, based upon the output from the lens barrel position detection switch 114, and if the lens barrel is retracted the flow of control passes to the step S1402, while if it is not then the flow of control is transferred to the step S1406.

When the photographic lens barrel is not in the retracted position, changeover of the photographic mode is performed. The changeover cycle for the photographic mode is shown in FIG. 13. The system changes over the photographic mode to the next value therefor in sequence, according to the cycle shown in FIG. 13. Thus: if the present photographic mode is vista mode, the system changes over to single self timer mode; if the present photographic mode is single self timer mode, the system changes over to double self timer mode; if the present photographic mode is double self timer mode, the system changes over to normal photography mode; and, if the present photographic mode is normal photography mode, the system changes over to vista mode. At this time, those symbols on the LCD display device 102 which are appropriate to that photographic mode which has been terminated and to that one which has been commenced are turned off and on respectively, as schematically shown towards the right side of FIG. 13. After the changing over of the photographic mode, the flow of control passes to the decision step S1407, which loops around in a tight loop while the photographic mode select switch 111 is ON; and when said photographic mode select switch 111 is turned OFF the flow of control returns to the FIG. 18B flow chart of the main routine.

On the other hand, if the photographic lens barrel is in the retracted position, in the step S1402 a decision is made as to whether or not the system has already gone into the correction mode. If the system is already in the correction mode, then the flow of control passes next to the step S1403, while if not the flow of control skips to the decision step S1404. If the system is not in the correction mode, then in the step S1404 the system loops around in a tight loop until the photographic mode select switch 111 is OFF, when the flow of control returns to the FIG. 18B flow chart of the main routine. On the other hand, if the system is already in the correction mode, then in the step S1403 the clock data is corrected. In detail, the contents of that one of the upper left block, the upper middle block, and the upper right block of the LCD display device 102 which is flashing are increased by 1. For example, when the display mode is "YMD" (year-month-day), and if it is the upper left block on the display (currently therefore representing the year) which is flashing, and if the current value shown on that upper left block is "94", then this value is increased by 1 to "95", and the flashing thereof is continued. After this step, the flow of control continues to the step S1404, in which as before the system loops until the photographic mode select switch 111 is OFF, and then returns to the main routine.

FIGS. 23A and 23B are flow charts showing the details of the photographic processing routine which was summarized as the step S1110 of FIG. 18B.

The microcomputer 101 executes this routine when the first stroke switch 112 is turned on. First, in the step S1501, a decision is made as to whether or not the barrel of the photographic lens of the camera is in its retracted position, based upon the output from the lens barrel position detection switch 114, and if the lens barrel is retracted, since photography is impossible in this condition, the flow of control returns to the main routine; while, if the lens barrel is not retracted, the flow of control passes to the step S1502 and the following steps so as to perform photography. In the step S1502, the upper portion of the liquid crystal display device 102 is changed over from displaying the film frame number to displaying date/time data. Next, in the step S1503, the microcomputer 101 controls the photometric circuit 104 and measures the brightness of the object to be photographed, and in the next step S1504 it controls the distance measurement circuit 105 so as to measure the photographic distance. Next, in the decision step S1505, a decision is made as to whether or not flash illumination is required for photography, based upon the brightness and the distance of the object to be photographed as determined above. If the current flash photographic mode is the automatic flash mode, it is deemed that flash illumination is required when the detected brightness is less than a predetermined value. Further, flash illumination is never supplemented if the current flash photographic mode is the flash inhibit mode, whatever may be the brightness which is detected. Yet further, flash illumination is always supplemented if the current flash photographic mode is the forced flash mode, whatever may be the brightness which is detected. If in the decision step S1505 it is decided that flash illumination is required the flow of control passes to the step S1607, while if it is decided that no flash illumination is required the flow of control passes to the step S1506.

For photography using flash illumination, in the step S1607 a decision is made as to whether or not the charging of the flash device has been completed or not, and if the charging is complete the flow of control passes to the step S1506, while if the charging is not complete the flow of control passes to the step S1608. When the charging of the flash device has not yet been completed, in the step S1608 the system loops waiting until the first stroke switch 112 is turned OFF, and then control passes to the step S1609, in which the upper portion of the liquid crystal display device 102 is changed over from displaying date/time data to displaying the film frame number; and after this the flow of control returns to the main program, so that in this case photography is not performed. On the other hand, if the charging of the flash device has been completed so that preparation for flash photography has been completed, or (in the NO branch from the decision step S1505) if no flash illumination is required, then the flow of control reaches the decision step S1506, and here the state of the second stroke switch 113 is queried. If the second stroke switch 113 is ON the flow of control proceeds to the step S1507 of the FIG. 23B flow chart, while if the second stroke switch 113 is OFF the flow of control proceeds to the step S1610. When the shutter is not being released by the shutter release button being second stroke pressed so as to turn said second stroke switch 113 ON, i.e. in the step S1610, the state of the first stroke switch 112 is queried. If the first stroke switch 112 continues to be ON, then the flow of control loops back to the step S1506 again, while if the first stroke switch 112 is OFF then the flow of control passes to the step S1611, in which the upper portion of the liquid crystal display device 102 is changed over from displaying date/time data to displaying the film frame number; and after this the flow of control returns to the main program.

When on the other hand the shutter is being released so that the second stroke switch 113 is ON, in the step S1507 (see FIG. 23B) the upper portion of the liquid crystal display device 102 is changed over from displaying date/time data to displaying the film frame number, and then the flow of control passes to the step S1508, in which a decision is made as to whether the current photographic mode is a self timer mode (either single or double), and if it is then in the step S1509 the system waits for a period of about 10 seconds before proceeding to the next step S1600, while if the current photographic mode is not a self timer mode then the flow of control skips past this step S1509 to arrive at the step S1600 directly. In the step S1600, the photographic lens is driven by a lens drive device not shown in the figures to its proper position, based upon the photographic distance detected in the above described step S1504. In the next step S1601, the shutter is opened and then closed at an appropriate timing so as to expose the current film frame. At this time, if flash illumination is required for photography, the flash device is caused to emit light. If this happens, then the recharging of the flash device is immediately commenced as soon as the emission of light has stopped, so that said flash device should be ready for the next flash illumination episode as soon as possible. Next, in the step S1602, the photographic lens is returned to its initial position by the operation of the lens drive device, and the flow of control proceeds to the step S1603, in which a decision is made as to whether or not the current data imprint mode is OFF. If the data imprint mode is OFF, the flow of control skips the next step S1604 and jumps directly to the step S1605, but otherwise the flow of control is passed to the step S1604. Here, the currently set imprint data is imprinted onto the current film frame by the data imprinting circuit 107. In the next step S1605 winding on of the film is performed by the film winding circuit 106, and in the next step S1606 the first stroke switch 112 is queried. While said first stroke switch 112 continues to be ON, the flow of control loops back to the step S1606 again, to wait until said switch 112 goes OFF, when the flow of control returns to the FIG. 18B main routine.

By the camera according to this second preferred embodiment of the present invention functioning in the manner described above, with the date being displayed upon the display device when the changing over of the battery is detected, the photographer is prompted to reset the clock when the battery has been changed over, so that it is possible to prevent a mistaken date and/or time of photography being imprinted on the film, even if the user of the camera forgets to reset the clock data after changing the battery.

It should be understood that, for the principle of the present invention, the details of the photographic modes, the flash photography modes, and the data imprint modes are not to be considered as limited to those described above with regard to the two preferred embodiments disclosed. Further, although in the two preferred embodiments disclosed above just two control switches were used for setting the various photographic functions, this is not to be considered as limitative of the present invention, and the present invention could also be applied to a camera which used, for example, three or more such control switches. Yet further, although in the two preferred embodiments disclosed above the data imprinting process was performed before the film was wound on to the next film frame, in fact the timing of the data imprinting process is not to be considered as thus limited, and it would be possible to apply the present invention, for example, to a camera in which the data imprinting process was performed by selectively illuminating certain appropriate ones of a set of LEDs while the film was being wound on, so that the film was imprinted in a pattern made up from individual dots.

Moreover, although in the above described preferred embodiments of the present invention it was, by way of example, shown that the photographic date/time data was imprinted upon the film by being recorded thereon in an optical fashion by an imprinting circuit, the present invention can also be applied to a camera which records the photographic date/time data upon a film or upon some other type of recording medium in an electromagnetic manner. For illustration purposes, this type of electromagnetic recording device or optical recording device is shown as the data imprinting circuit 7 in FIG. 1 and as the data imprinting circuit 107 in FIG. 15. Also, although in the two above described preferred embodiments of the present invention it was shown, by way of example, that all of the devices in the camera were supplied with operating electrical power from a single battery which started the clock when it was loaded into the camera, in fact the present invention can also be applied to a camera which is provided with separate batteries, one for operating the clock and the other for operating the remainder of the equipment of the camera. In such a case, it is proper to detect the changing of the battery for the clock, and after the battery has been changed, until the clock has been reset, to prevent the recording of the date and/or time of photography. Other variations are also possible in the form and the context of the present invention, without departing from its scope. Accordingly, although the present invention has been shown and described in terms of several preferred embodiments thereof, it is not to be considered as being limited by any of the perhaps quite fortuitous details of said embodiments or of the drawings, but only by the terms of the appended claims, which follow.

We claim:

1. A camera comprising:
   a clock that operates according to electrical power supplied from a battery and outputs a date and a time;
   a reset switch to reset the date and the time of said clock;
   a data imprint device to imprint the date and the time of photography based upon the date and the time output from said clock;
   a changeover detector that detects a changeover of said battery; and
   a control device that prevents the imprinting of the date and the time of photography by said data imprint device when the changeover of said battery is detected by said changeover detector, the control device further ceasing prevention of said imprinting when the date and the time of said clock have been reset by said reset switch.

2. A method of a data imprint of a camera that imprints a date and a time of photography based upon the date and the time output from a clock that operates based on electric power supplied from a battery, the method comprising the steps of:
   preventing the imprinting of the date and the time of photography when changing over of said battery is detected, and
   ceasing the prevention of said imprinting when the date and the time of said clock have been reset.

3. A method of a data imprint of a camera that imprints a date and a time of photography based upon the date and the time output from a clock that operates based on electric power supplied from a battery, the method comprising the steps of:
   preventing the imprinting of the date and the time of photography and forcibly displaying the date and the time output from said clock on a display device that alternatively displays either the date and the time output from said clock or the film frame number, when changing over of said battery is detected, and
   ceasing the prevention of said imprinting when the date and the time of said clock have been reset.

4. A camera comprising:
   a clock that operates based on electrical power supplied from a battery and outputs a date and a time;
   resetting means for resetting the date and the time of said clock;
   recording means for recording the date and the time of photography based upon the date and the time output from said clock;
   changeover detection means for detecting changeover of said battery; and
   prevention means for preventing the recording of the date and the time of photography by the recording means when the changing over of said battery is detected by said changeover detection means, and for ceasing the prevention of said recording when the date and the time of said clock have been reset by said resetting means.

5. A camera according to claim 4, wherein said recording means optically imprints said date and said time of photography upon a film.

6. A camera according to claim 4, wherein said recording means electromagnetically imprints said date and said time of photography upon a recording medium.

7. A camera according to claim 4, further comprising:
   a display device that alternatively displays either the date and the time output from said clock or the film frame number; and
   a display control means for forcibly displaying the date and the time output from said clock on said display device when the changeover of said battery is detected by said changeover detection means.

8. A camera comprising:
   a clock that operates based on electrical power supplied from a battery and outputs the date and the time;
   a display device that alternatively displays either the date and the time output from said clock or the film frame number;
   a changeover detector that detects a changeover of said battery; and
   a control device that forcibly displays the date and the time output from said clock on said display device when the changeover of said battery is detected by said changeover detector.

9. A camera comprising:
   a clock that operates based on electrical power supplied from a battery and outputs the date and the time;
   a display device that alternatively displays either the date and the time output from said clock or the film frame number;
   changeover detection means for detecting changeover of said battery; and
   display control means for forcibly displaying the date and the time output from said clock on said display device when the changeover of said battery is detected by said changeover detection means.

* * * * *

UNITED STATES PATENT AND TRADEMARK OFFICE
CERTIFICATE OF CORRECTION

PATENT NO. : 5,579,066
DATED : November 26, 1996
INVENTOR(S) : Hidenori MIYAMOTO et al.

It is certified that error appears in the above-indentified patent and that said Letters Patent is hereby corrected as shown below:

On the title page, item [73] should read as follows:

Item [73] Assignee: Nikon Corporation, Tokyo, Japan

Signed and Sealed this

Eighteenth Day of March, 1997

*Attest:*

BRUCE LEHMAN

*Attesting Officer*  *Commissioner of Patents and Trademarks*